(12) United States Patent
Asakura et al.

(10) Patent No.: US 6,778,065 B1
(45) Date of Patent: Aug. 17, 2004

(54) REMOTE CONTROL SYSTEM FOR A VEHICLE

(75) Inventors: Suguru Asakura, Saitama (JP); Akira Nagai, Saitama (JP); Kentaro Yoshimura, Saitama (JP); Munehisa Nozawa, Saitama (JP); Sadanori Watarai, Miyazaki (JP)

(73) Assignees: Honda Giken Kogyo Kabushiki Kaisha, Tokyo (JP); HondaLock Mfg., Co., Ltd., Miyazaki (JP)

( * ) Notice: Subject to any disclaimer, the term of this patent is extended or adjusted under 35 U.S.C. 154(b) by 399 days.

(21) Appl. No.: 09/612,315

(22) Filed: Jul. 7, 2000

(30) Foreign Application Priority Data

Aug. 9, 1999 (JP) .......................................... 11-225049

(51) Int. Cl.[7] .............................................. G05B 19/00
(52) U.S. Cl. .................... 340/5.61; 340/5.64; 340/5.72; 340/5.62; 340/2.1; 340/2.2; 340/2.7; 340/825.69
(58) Field of Search ................................ 340/7.2, 5.64, 340/5.61, 5.62, 5.72, 2.1, 2.7, 825.69, 5.2, 5.8, 10.1, 5.5, 10.4, 825.72; 307/10.1, 10.2

(56) References Cited

U.S. PATENT DOCUMENTS 5,973,611 A * 10/1999 Kulha et al. ............ 340/825.31
6,552,649 B1 * 4/2003 Okada et al. ............... 340/5.61

FOREIGN PATENT DOCUMENTS

| EP | 0 937 844 A1 | 8/1999 |
|---|---|---|
| JP | 5-106376 | 4/1993 |
| JP | 10-25939 | 1/1998 |
| JP | 10-53025 | 6/1998 |
| JP | 11-141211 | 5/1999 |

* cited by examiner

Primary Examiner—Michael Horabik
Assistant Examiner—Vernal Brown
(74) Attorney, Agent, or Firm—Westerman, Hattori, Daniels & Adrian, LLP

(57) ABSTRACT

A remote control system for precisely identifying a distance from the vehicle to an entry key and favorably controlling a vehicle-mounted device such as a door corresponding to the distance. The system comprises a transmitter transmitting different types of response demand signals within a predetermined communication area outside the vehicle, a vehicle mounted receiver for receiving a response signal released from a portable transmitter/receiver in response to the reception of the response demand signal, a controller controlling the vehicle mounted device corresponding to the reception of the response signal by the vehicle mounted receiver. Locking and/or unlocking door(s) of the vehicle are controlled on the basis of whether or not the receiver receives the response signal to a response demand signal other than one having the largest communication area.

6 Claims, 20 Drawing Sheets

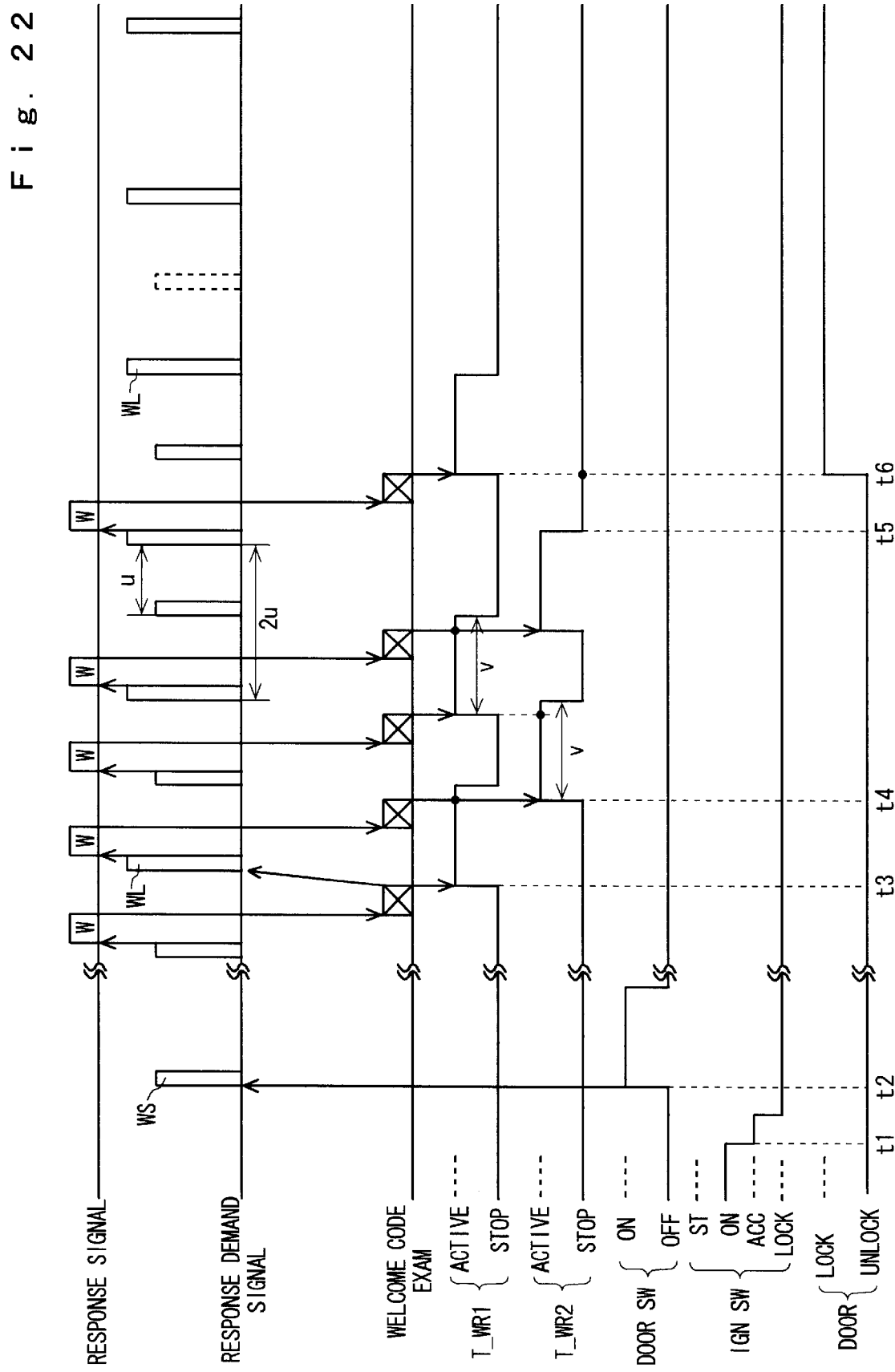

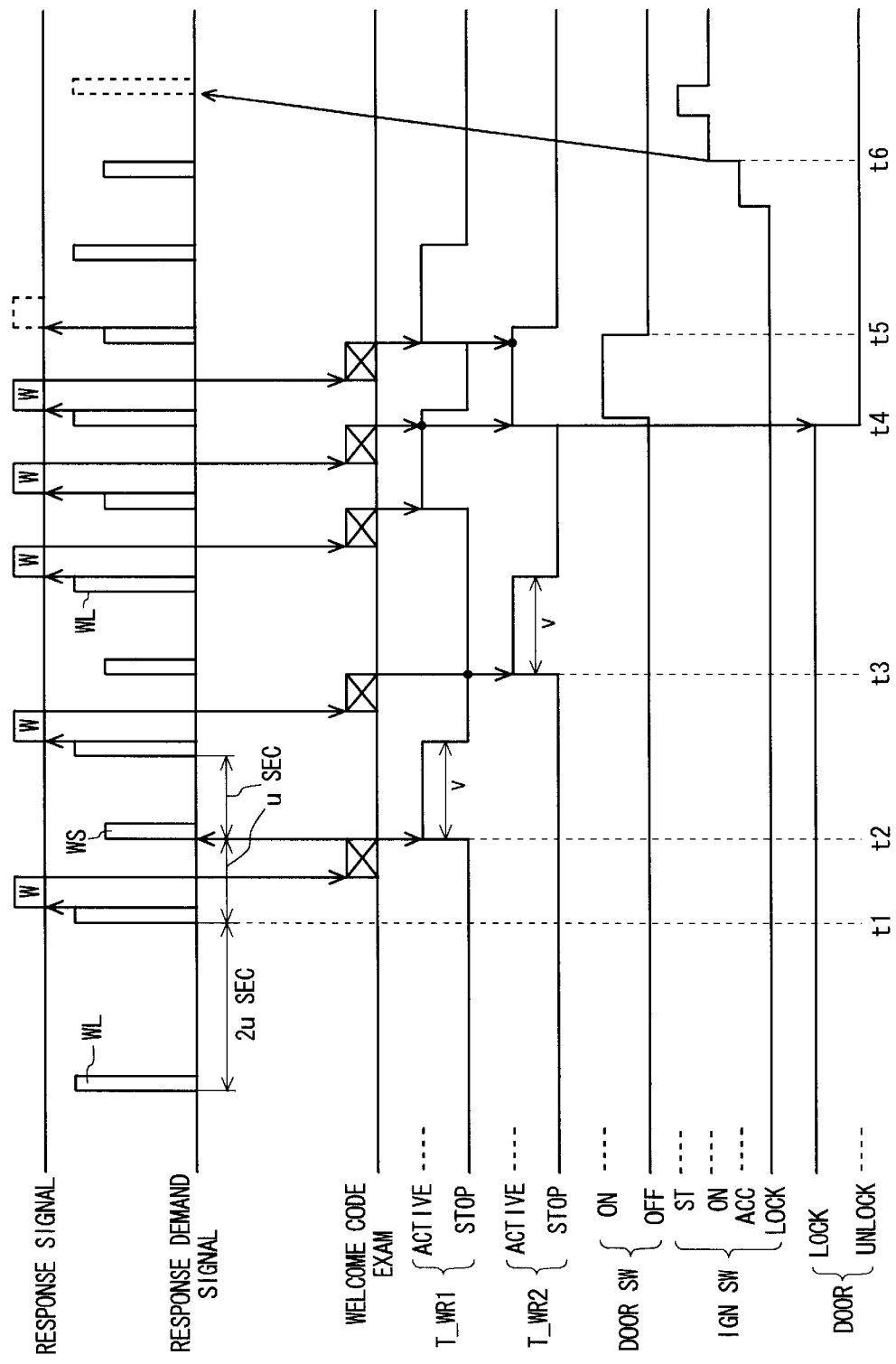

REMOTE CONTROL SYSTEM FOR A VEHICLE

BACKGROUND OF THE INVENTION

1. Field of the Invention

The present invention relates to a remote control system for a vehicle which can automatically lock and unlock the door(s) of a vehicle in wireless communication and more particularly to a remote control system for a vehicle which can automatically lock the door(s) of a vehicle when a user (driver) who carries with him an electronic or entry key (with a portable transmitter/receiver) which includes an identification code assigned to the vehicle walks away a predetermined distance from the vehicle and automatically unlock the same when the user comes back to the distance.

2. Description of the Related Art

Lock/unlock remote-control systems for vehicle doors are known having a so-called, "welcome function". In the systems, every user (driver) of a vehicle owns an entry key (with a portable transmitter/receiver) which upon receiving a response demand signal that is transmitted from a transmitter installed in the vehicle and is receivable within a predetermined range about the vehicle (which may be referred to as "having a predetermined communication area" hereinafter), can transmit a response signal carrying a unique identification code assigned in advance to each vehicle. When the user walks away from the predetermined range of the vehicle and its entry key is disabled to receive the response demand signal and thus to transmit back the response signal, the door of the vehicle is automatically locked. When the entry key moves into the predetermined range and its response demand signal is received by the transmitter/receiver which then responses thereto to send back a response signal, the door is automatically unlocked.

For example, some of such conventional "welcome function" based lock/unlock remote-control systems for vehicle doors are disclosed in Japanese Patent Laid-open Publications (Heisei)5-106376 and (Heisei)10-25939 in which a transmitter mounted on a vehicle is provided for intermittently transmitting a response demand signal having a predetermined communication area and, when receiving a signal responding to the response demand signal from an entry key which is carried by the user of a vehicle and moves into the predetermined communication area, examining whether the response signal is valid (regular) or not (welcome code examination). When the response signal has been examined to be valid, the door(s) of the vehicle is automatically unlocked. On the contrary, when the response signal is not valid or when the entry key stays out of the predetermined communication area and the vehicle-mounted transmitter receives no response signal, the door remains locked.

Accordingly, when the user of the vehicle carrying the entry key simply walks away from the predetermined range of the vehicle, the door of the vehicle can automatically be locked without paying any attention to or operating the entry key. When the user comes into the range, the door can automatically be unlocked. This requires no boresome actions of unlocking the door for riding the vehicle as well as contributes to the prevention of failing to lock door(s), and of vehicle theft.

The conventional systems have some advantages, particularly once the communication area is preset to a smaller size (for example, one meter in radius), the systematic locking of the door can easily be confirmed after getting off the vehicle, the power consumption for transmitting signals can be as small as not hostile to a battery, and the ID code (uniquely assigned to a vehicle) can hardly be intercepted by any other parties. The locking of the door may be easily confirmed by auditorily and visually perceiving the sound of a door locking mechanism and the shift of an inside door lock knob to the lock position.

Another conventional system disclosed in Japanese Patent Laid-open Publication (Heisei)10-153025 is provided in which a transmission antenna for detecting the approaching of an object into a middle-sized area around a vehicle is mounted on the vehicle in addition to an antenna for transmitting the response demand signal. Upon detecting the approaching of the object or a driver into the middle-sized area, the vehicle releases the response demand signal with a small-sized predetermined communication area and, when receiving a response signal to the response demand signal from the entry key of the right driver, unlock the door. Also, a second transmitting means having a greater communication area is provided for locking the door. The door is thus locked when the communication to the entry key with the second transmitting means is disabled.

According to the conventional systems, when the communication area for the response demand signal is set to be wide enough to detect the driver approaching into the area of the vehicle at an earlier occasion, the door(s) can be unlocked positively before the driver reaches the vehicle. This eliminates the need of the door being unlocked by the driver or user and provides the ease of getting in the vehicle with operating only a door outer handle, hence improving the utility.

However, as the communication area is wide, the locking of the door will be carried out only when the user departs further from the vehicle, hence causing the user to confirm the door locking (through listening to the sound of the door locking mechanism or viewing the shift of the inside door lock knob to the lock position) with much difficulty. Also, while the user with the entry key walks about or pursues a job (e.g. ordering throughout the trunk room), the door locking is not performed and it may fail to protect articles in the vehicle from a thief.

In particular, when the user with the entry key is departing from the vehicle, its back is often turned to the vehicle. The wider the predetermined communication area, the longer the period of the door remaining unlocked is extended and thus the higher the risk of being thieved will be increased. Also, the wider communication area requires a higher level of power for transmitting the response demand signal and the power consumption will be soared up drawing more power from the battery.

For compensation, a modification is proposed such as disclosed in Japanese Patent Laid-open Publication (Heisei) 10-25939, where the communication area is reduced (about one meter in radius) allowing the response demand signal to be not received in a shorter distance from the door thus to lock the door. This permits the door locking to be easily confirmed, the ID code (ID number) to be hardly intercepted, and the power for signal transmission to be minimized, hence lowering the power consumption.

However, the above modification will hardly ensure the unlocking of the door. It is common in the art for minimizing the power consumption for transmitting the response demand signal that the response demand signal from the vehicle is usually transmitted intermittently. With the wider communication area, the user moving in the wider area is able to communicate with the vehicle, even if the response demand signal is transmitted with longer intermission period. Accordingly, the door is surely unlocked before the user arrives at the vehicle.

With the smaller communication area, however, when the user rushes to the vehicle in less time through the communication area, the communication between the vehicle-mounted transmitter and the entry key may not be completed until the user arrives at the vehicle. This causes the door to remain locked and its door outer handle may have to be operated a number of times without success. As a result, the entry key system will be lost in commercial value. As a further modification, the period of the intermittent transmission of the response demand signal may be shortened. This will however increase the power consumption and cause more power be drawn from the battery.

On the other hand, the conventional system disclosed in the above-mentioned Japanese Patent Laid-open Publication (Heisei)10-153025 allows the power for transmitting the response demand signal to be possibly decreased, but it requires the extra transmission antenna for detecting the invading of an object, hence increasing the complexity of the overall arrangement and thus the cost of the system. Also, the power consumption will be increased by the additional equipment. Moreover, the above system transmits the response demand signal even when any other personal or creature than the right entry key (user) advances close to the vehicle, hence requiring more improvement for the power consumption. Since the communication area is too small to examine whether the entry key is right or not as required before accepting the unlocking, the door may remain not unlocked when the user or driver rushes to and arrives at the vehicle. This will result in the misconduct of the automatic unlocking function.

SUMMARY OF THE INVENTION

An object of the present invention is to provide a remote control system for a vehicle which can predictably control a vehicle mounted device such as a door of the vehicle corresponding to the distance from the vehicle to an entry key.

As a first feature of the present invention, the remote control system for a vehicle comprises: a transmitter mounted on the vehicle for transmitting a plurality of response demand signals which are receivable within different sizes of a predetermined range outside the vehicle; a portable transmitter/receiver for receiving the response demand signals and sending back a response signal; a receiver mounted on the vehicle for receiving the response signal sent back from the portable transmitter/receiver; and a controlling means for controlling vehicle-mounted components corresponding to the reception of the response signal by the receiver, wherein said controlling means are arranged to control at least either unlocking or locking of the door(s) of the vehicle depending on whether the response signal to a type of the response demand signal other than a particular response demand signal being receivable in the largest size of the predetermined range is received or not by the receiver.

As a second feature of the present invention, the transmitter intermittently transmits different types of the response demand signals receivable within corresponding sizes of the predetermined range, and the controlling means identifies a particular predetermined range where the portable transmitter/receiver is located on the basis of the interval between receptions of the response signals and controls the vehicle-mounted components in a predetermined mode, corresponding to the size of the predetermined range where the transmitter/receiver is located.

As a third feature of the present invention, various types of response demand signals are intermittently transmitted at different intervals such that the transmission of one type of the response demand signal receivable within a smaller predetermined range is transmitted at least once between two adjacent transmitted timings of another type of the respond demand signal receivable in a wider predetermined range.

As a fourth feature of the present invention, the response signals sent back from the portable transmitter/receiver are discriminatable one another according to which size of the predetermined range of the respond demand signal that the respond signals respond to.

As a fifth feature of the present invention, when the disembarkation of the user is detected and the user is departing from the vehicle, a type of the response demand signal receivable within the smallest size of the predetermined range is transmitted from the transmitter, and when the response signal showing reception of the response demand signal receivable in the smallest size of the predetermined range is no more received by the receiver mounted on the vehicle, another type of the response demand signal receivable within the second smallest size of the predetermined range is begun to be transmitted from the transmitter and, in a similar manner, when the response signal to a type of the response demand signal receivable in a relatively smaller size of the predetermined range is no more received by the receiver mounted on the vehicle, a further type of the response demand signal receivable within a relatively larger size of the predetermined range is begun to be transmitted in sequence from the transmitter.

As a sixth feature of the present invention, when the entry key is approaching to the vehicle and the response signal to the type of the response demand signal receivable within the largest size of the predetermined range is first received by the receiver mounted on the vehicle, the response demand signal receivable within second largest size of the predetermined range is transmitted from the transmitter and then a response demand signal receivable within a relatively smaller size of the predetermined range is transmitted in sequence from the transmitter.

As a seventh feature of the present invention, when the embarkation of the user is detected by the embarkation detecting means, a type of the response demand signal receivable within the vehicle is transmitted from the transmitter.

According to the first feature of the present invention, the distance from the vehicle to the user carrying the portable transmitter/receiver (entry key) can precisely be identified thus to control the vehicle mounted device such as the door(s) at an optimum length of the distance, hence improving the utility of controlling the vehicle mounted device such as unlocking and locking the door is compatible with the anti-thief function.

According to the second feature of the present invention, the distance range from the vehicle to the user carrying the portable transmitter/receiver can be identified on the basis of the interval between receiving timings of the sent-back response signal on the vehicle even if characteristic codes included in the response signals are not different each other, which response signals are sent back from the portable transmitter/receiver that responds to a plurality types of the response demand signal receivable within their respective sizes of the predetermined ranges which are different each other. Hence, the vehicle mounted device can favorably be controlled depending on the distance as well as the construction of the transmitter of the portable transmitter/ receiver and the code identifying action of the controlling means on the vehicle can significantly be simplified.

According to the third feature of the present invention, the response signal is also intermittently released from the portable transmitter/receiver, thus providing the same effects and advantages as described just above.

According to the fourth feature of the present invention, as the response signals released from the portable transmitter/receiver in response to reception of the response demand signal are different each other based on the different sizes of the receivable ranges of the demand signals, the distance from the vehicle to the portable transmitter/receiver can be identified only from the response signal received and the optimum control of the device mounted on the vehicle can be performed in accordance with the distance.

According to the fifth and sixth features of the present invention, at the disembarkation of the user, as the portable transmitter/receiver carried by the user departs far from the vehicle, the transmission of the response demand signal receivable in a wider size of the predetermined range is executed in sequence and the transmission of the response demand signal receivable in a smaller size of the predetermine range is canceled. As the potable transmitter/receiver comes from far towards the vehicle, on the other hand, the transmission of the response demand signal with a relatively smaller predetermined receivable range is not executed before the response signal responding to the response demand signal with a relatively larger predetermined receivable range is received by the vehicle.

More particularly, while the portable transmitter/receiver is out of the largest predetermined receivable range, the response demand signal receivable in the largest predetermined range only is transmitted. Only when the response signal responding to the response demand signal receivable in the largest predetermined range is received by the vehicle, the transmission of the response demand signal being receivable in a smaller size of the predetermine range and used for actually controlling the unlocking and locking of the door is executed. Therefore, the transmission of the response demand signal is minimized hence reducing the consumption of a power from a battery equipped on the vehicle.

According to the seventh feature of the present invention, the user carrying the portable transmitter/receiver in the vehicle can readily be acknowledged, and the vehicle mounted device in the vehicle is controlled on the basis of the response signal from the portable transmitter/receiver responding to a particular type of the response demand signal receivable within the vehicle, hence improving the anti-thief function.

BRIEF DESCRIPTION OF THE DRAWINGS

FIG. 22 is a timing chart illustrating the automatic locking action of the door in the still further embodiment of the present invention when the driver disembarks and the entry key departs from the vehicle;

FIG. 23 is a timing chart illustrating the automatic unlocking action of a door in the still further embodiment of the present invention when the deriver carrying the entry key moves to the vehicle and embarks;

DETAILED DESCRIPTION OF THE PREFERRED EMBODIMENTS

Figure 1:
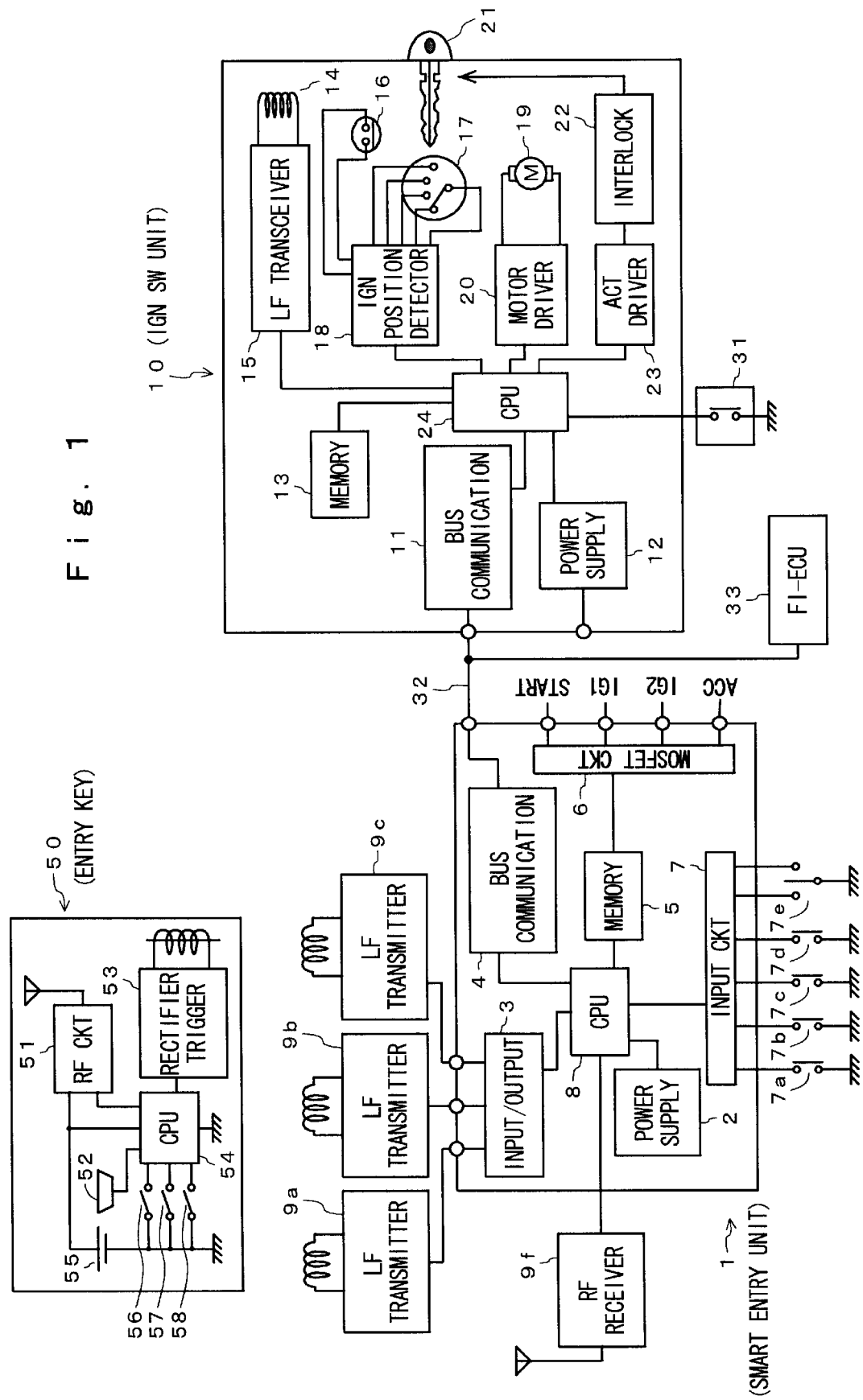
FIG. 1 is a block diagram showing a structure of the first embodiment of the present invention.

An entry key system for a vehicle according to first embodiment of the present invention will be describe in more detail referring to the accompanying drawings. Before starting the main description, some definitions on the flags at 1 of the bit and the timers employed in the description and the drawings are explained as listed below.

AREC=reception of A code;
ATM=transmission of A response demand signal;
BCHG=start of examining the shift from small B response demand signal to large B response demand signal;
BLTM=transmission of large B response demand signal;
BREC=reception of B code;
BSTM=transmission of small B response demand signal;
I(variable)=the number of consecutive receptions of A code;
IMCHK=start of immobilizing checkup;
IMDONE=finish of immobilizing checkup;
IMOK=result of immobilizing checkup;
m(variable)=setting in timer T-OUT;
MOD(n,m)=remainder of n/m;
n(variable)=setting for the kind of response demand signals to be transmitted;
OUT=the entry key is out of communication area for A response demand signal;
RCHK=timer T-OUT has started for examining the entry key is not near about vehicle;
RF1/2=finish of refresh procedure 1, 2, respectively;
T-BCHG=timer for setting exchange of B response demand signals;
T-IMCHK=timer setting time for immobilizing checkup;
T-OUT timer setting time for judging that the entry key is out of communication area for A response demand signal;
T-WR1/2=first and second timers each for measuring intervals of signal reception;
timer interrupt permission bit for response demand signal= timer interruption permission for transmission of response demand signal.

A first embodiment of the present invention will be described in the form of a remote control system for a vehicle referring to the block diagram of FIG. 1.

A smart entry unit 1 comprises a power supply circuit 2 such as a battery equipped on the vehicle, an input/output circuit 3 connected to LF (low frequency) transmitter circuits 9a to 9c, a bus communication circuit 4 connected by a communication line 32 to an ignition SW unit 10 which will be described later, a memory circuit 5, an MOSFET circuit 6, an input circuit 7, and a CPU 8 connected to above-mentioned circuit components for controlling their actions. The CPU 8 is further connected to an RF receiver circuit 9f. The input circuit 7 is connected to a manual SW 7a for setting the system to a manual mode in which it is responsive to only a manual code derived by manual operation from an entry key 50 which is described later, as well as a parking SW 7b, four door SWs 7c, an engine hood SW 7d, a door key cylinder SW 7e, and so on.

The entry key 50 which is usually carried and manipulated by a driver or user of the vehicle comprises an RF circuit 51 for transmitting an RF signal from an antenna, an alarm/display 52 such as a buzzer, a rectifier trigger (TRIG) circuit 53 for processing LF signals received which are transmitted from the LF transmitter circuits 9a to 9c, a CPU 54, a battery 55, manual switches 56 and 57 for transmitting manual codes for manually locking and unlocking the door, and a switch 58 for allowing/prohibiting the manual operation. The switches 56 and 57 maybe modified into a single switch for repeating alternately the lock and unlock actions.

The ignition SW unit 10 comprises a bus communication circuit 11 for exchanging signals via the communication line 32 with the smart entry unit 1, a power supply circuit 12, a memory circuit 13, an immobilizing (anti-thief functioning) antenna 14, a low frequency (LF) transmitter/receiver circuit 15, a key SW 16 for detecting the insertion/extraction of a key, an ignition (IGN) SW 17, an IGN position detector 18 for detecting the contact position of the IGN SW 17, a motor 19 for actuating a rotary contact of the IGN SW 17, a motor driver 20 for driving the motor 19, an auxiliary (or emergency) key 21 which is inserted and extracted to and from the key cylinder, an interlock ACT (actuator) 22 for prohibiting the removal (or extraction) of the auxiliary key 21, an ACT driver 23 for driving the interlock ACT 22, and a CPU 24 for controlling the actions of the above-mentioned components. The CPU 24 is also connected to a quick start SW 31 for starting the engine.

Figure 2:
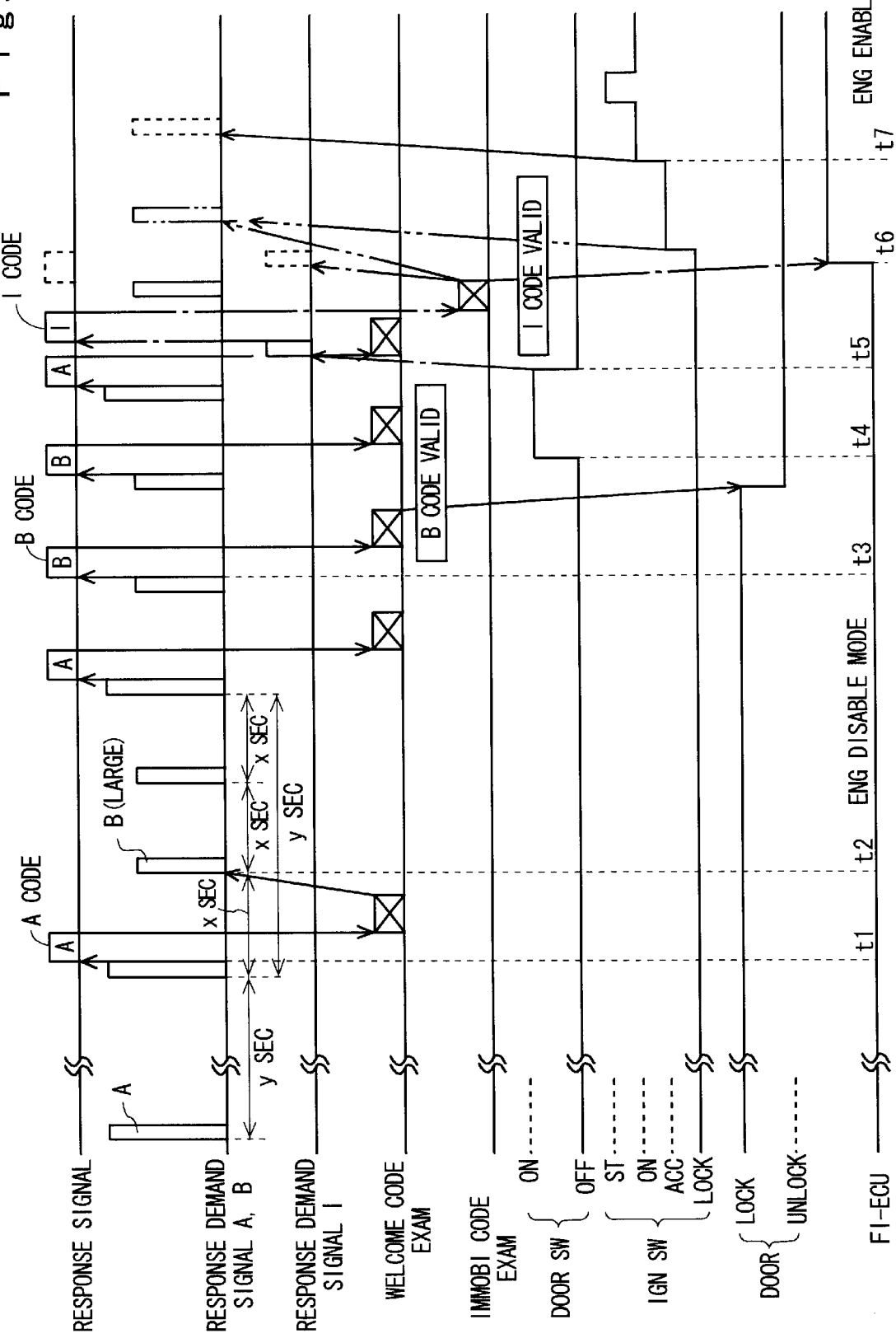
FIG. 2 is a timing chart illustrating the automatic unlocking action of a door in the first embodiment of the present invention when the driver carrying the entry key moves to the vehicle and embarks.
Figure 3:
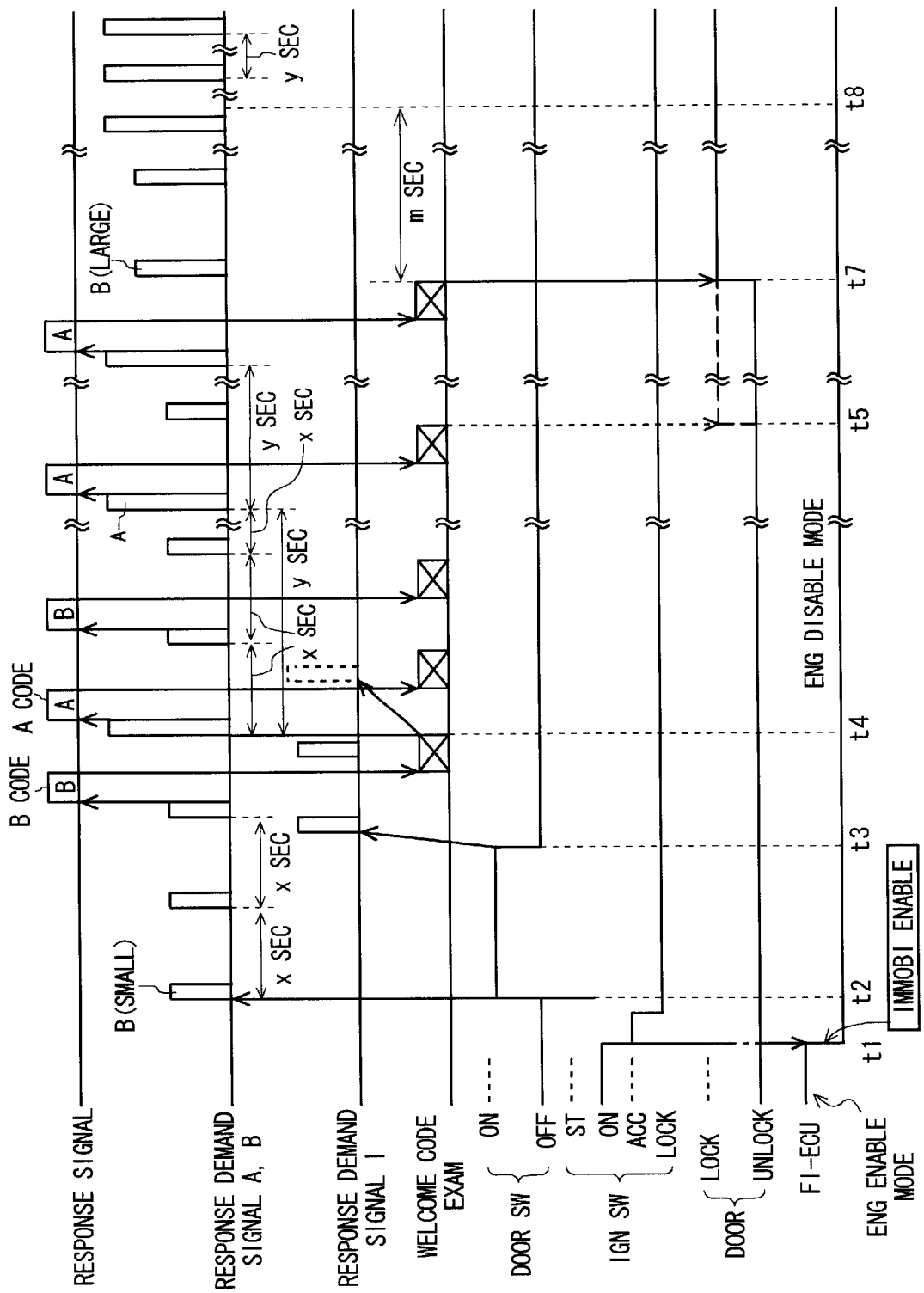
FIG. 3 is a timing chart illustrating the automatic locking action of the door in the first embodiment of the present invention when the driver disembarks and the entry key departs from the vehicle.
Figure 13:
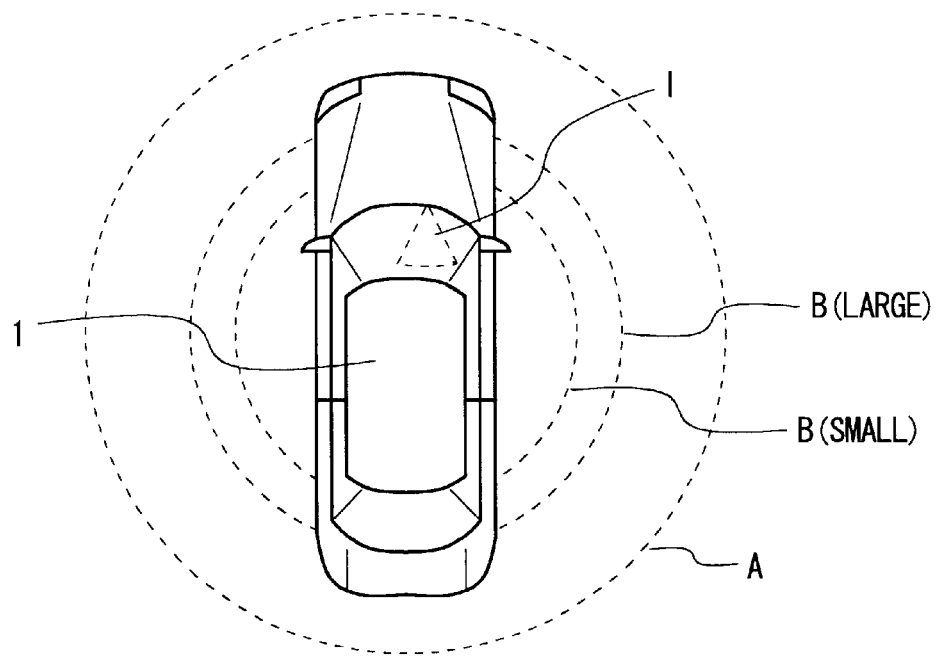
FIG. 13 is a schematic view showing the relation between the control operations and the distance from the vehicle to the entry key in the first embodiment of the present invention.

The operation of the smart entry unit 1 and the entry key 50 will schematically be described referring to the timing charts of FIGS. 2 and 3 and the schematic view of FIG. 13. FIGS. 2 and 3 illustrate the welcome function in which the door of the vehicle is unlocked and locked in response to the detection of the user carrying the entry key 50 (who may hence be simply referred to "entry key" hereinafter) coming close to the vehicle 1 for boarding and leaving from the vehicle 1 after getting off, respectively. In these figures, the height of the bars of the response demand signals represents the intensity of the signals thus indicating the size of the communication area (receivable range).

When the entry key is outside of and distanced significantly from the vehicle of which the door remains locked in a disembark or parking mode, an A response demand signal (of e.g. 100 kHz) shown at the left side end in FIG. 2 is transmitted from the vehicle at equal intervals of a first predetermined time (y seconds) and with an intensity corresponding to the maximum communication area (for example, 4 to 5 meters in radius) denoted by A in FIG. 13. As the driver carrying the entry key moves into the communication area A for the A response demand signal, the entry key receives the A response demand signal at the moment t1 and transmits a send-back signal or a response signal responding to the A response demand signal which includes an A code and may be referred to as "A code" hereinafter. The format of the response signal will be explained later in more detail referring to FIG. 15.

The vehicle, when receiving the response signal and judging that the response signal received is valid, releases a large-area B response demand signal (e.g. of 300 kHz and having a one-meter-radius communication area denoted by B (large) in FIG. 13) from t2 at equal intervals of a second predetermined time (x seconds). It is assumed y>x or more specifically, y=3x in this embodiment. Upon receiving the B large response demand signal at t3, the entry key 50 releases a response signal which includes a B code and may be referred to as a "B code" hereinafter. When it is judged that the response signal including the B code is valid, the door of the vehicle is unlocked.

As the door is opened at t4 (door SW is on) and then closed at t5, it is determined that the driver has embarked and an I (immobilizing) response demand signal designated its communication area as in the interior of the vehicle is transmitted. When the entry key then releases a response signal to the I response demand signal which include an I code (immobilizing code), the vehicle carries out immobilizing checkup (immobilizing code examination) for deciding whether the I code received is valid or not. When the I code is valid, the transmission of the I response demand signal is canceled and an FI-ECU 33 is switched at t6 into the engine enabling mode.

Then, upon the ignition SW (IGN SW) being turned to the ON position at t7, the transmission of both the A and B response demand signals is stopped and simultaneously a refresh 2 process is commenced as will be described later.

The transmission of the A and B response demand signals may be stopped, instead, upon judging that the I code is valid or in response to the on/off action of the door switch triggered by the opening and closing of the door.

The movement of the vehicle 1 is stopped and then as the IGN SW is turned from the ON position to the ACC position at t1 as shown in the left end of FIG. 3, the FI-ECU 33 is switched to the engine disabling mode. When the door SW is shifted from the OFF position (door closed) to the ON position (door opening) at t2 in the door unlock mode, it is judged that the driver is about to disembark and the transmission of a B small response demand signal (e.g. of 300 kHz having substantially a 0.5-meter-radius communication area denoted by B (small) in FIG. 13) is then commenced. This is followed by transmitting the B small response demand signal at equal intervals of the second predetermined time (x seconds) from the vehicle. Then, as the door SW is shifted from the ON position to the OFF position (door closed) at t3, the I response demand signal is transmitted at the predetermined intervals.

When the entry key is disembarked, it enables to receive not the I response demand signal but the B small response demand signal. Then a response signal to the B small response demand signal including the B code is released. When the response signal including the B code is receive and is judged to be valid at t4, the A response demand signal is commenced to be transmitted while the transmission of the I response demand signal is stopped. The entry key continues to release the A and B codes while receiving both the A and B small response demand signals.

As the driver with the entry key moves away from the vehicle and steps out from the B small area shown in FIG. 13, it is disabled to receive the B small response demand signal and no response signal with B code to the B response demand signal shall be sent back. When the B code is not received by the vehicle after a predetermined period from the reception of the A code (at t5 in FIG. 3), the B response demand signal is switched from the B small signal to the B large signal. As the B code is no more received after the predetermined period while the A code is received and its welcome code examination is executed (i.e. in this embodiment, only the A code is continuously received but the B code has not been received in y seconds), the door is then locked at t7 when the final A code is examined to be valid.

After t8 when the setting (m seconds) of the T-OUT timer has elapsed since the entry key is far enough away from the vehicle not to receive the A response demand signal and thus not to send back the A code, the intermittent transmission of only the A response demand signal at the intervals of y seconds is maintained. Alternatively, as denoted by the dotted line in FIG. 3, the door may be locked at t5 when the A code is received just after the reception of the B code at the estimated moment is not executed.

The operation of the smart entry unit 1 will now be described schematically referring to the flowcharts of FIGS. 4 and 5.

Upon energized, the system is initialized in its entirety (Step S1). At Step S2, it is examined whether the ignition switch (referred to an IGN SW hereinafter) is turned on or not. When the IGN SW is turned off by the driver to stop the vehicle at t1 in FIG. 3, the procedure goes to Step S3 where the refresh 1 process, i.e. the initialization of flags for the (anti-thief) immobilizing system, is carried out. This process at Step S3 will be explained later in more detail referring to FIG. 7.

This is followed by Step S5 where it is examined whether the door is unlocked or not. At Step S6, it is examined whether or not the door SW is turned from the ON position to the OFF position (i.e. whether the opened door of the vehicle is closed or not). As it is judged "NO" at Step S6 while the door is opened for disembarkation, the procedure jumps to Step S9 where it is examined whether or not the manual SW 7a is turned on for shifting the system to the manual mode where the door can be unlocked and locked using the manual switch. In normal, the manual SW 7a remains turned off (i.e. the manual mode is not selected) and it is judged "NO". It is then examined at Step S10 whether or not the door SW is turned from the OFF position to the ON position (i.e. the closed door is opened).

As the door is opened for disembarkation, the door switch is turned from the OFF position to the ON position and it is judged "YES" at Step S10. Then, Step S11 follows where it is examined whether the BREC flag is 1 or not (i.e. the B code is received or not). In the beginning, the B code is not received and the procedure advances to Step S12 where the BSTM flag is set to 1 and the variable n for determining the type of the response demand signal (A, B small, or B large) is reset to 0.

Step S12 is a process of selecting the type of the response demand signal to be transmitted and, as will be explained later, the B small type having a smaller communication area is set. At Step S13, the timer interruption permitting bit for enabling the transmission of the response demand signal is set, i.e. the transmission of the response demand signal by timer interruption is enabled.

Then Step S14 follows where it is examined whether the valid ID code is received or not. When it is affirmative, it is then judged at Step S15 what the function code is. More specifically, it is examined whether received signal is the response signal (A code or B code) from the entry key 50 or the manual code for the manual operation. In the beginning, it is judged "NO" at Step S14 and the procedure moves to Step S15A where it is examined based on the IMCHK flag whether the immobilizing checkup is finished or not. At the time, the immobilizing checkup is not performed and the procedure jumps to Step S30 (in FIG. 5). Similarly, it is judged "NO" at Step S30 and the procedure goes to Block S41. At Block S41, the flags for the welcome function are initialized when the code is not received during a predetermined period of time.

In fact, it is examined referring to the OUT flag at Step S31 whether or not the entry key is out of the communication area for the A response demand signal. In the beginning, it is not registered (i.e. OUT flag=0) that the entry key is out of the communication area for the A response demand signal. It is then examined at Step S32 whether the RCHK flag is 1 or not (i.e. the T-OUT timer for setting time duration to determine that the entry key is not adjacent to the vehicle, has been started or not). When it is judged "NO", the procedure goes to Step S33 where the T-OUT timer is set to m seconds. It is preferable that m satisfies m sec>y(=3x) sec≧z sec where y is the interval of transmission (or cycle) of the A response demand signal, x is the interval of transmission of the B response demand signal, and z is the interval of transmission of the I (immobilizing) response demand signal, as shown in FIG. 2. Then, at Step S34, the RCHK flag is set to 1 for starting the T-OUT timer.

This is followed by Step S35 where it is examined whether the T-OUT timer is turned to zero as the setting time of m seconds has been elapsed. In the beginning, the setting time of m seconds is not elapsed and thus the procedure returns back to Step S2.

As the driver disembarks and the door is closed, the door switch is shifted from the ON position to the OFF position allowing Step S6 to judge "YES". The procedure thus goes to Step S7 where the refresh 1 flag is reset to 0. Step S8 follows where the timer interruption permitting bit for permitting the transmission of the I response demand signal is initiated to enable the transmission of the I response demand signal with timer interruption. Then, the procedure moves to Steps S14, S15A, and S30, and Block S41 and returns back to Step S2.

As the entry key 50 is moved out of the vehicle, it receives the B small response demand signal and sends back the B code. The B code from the entry key 50 is received by the receiver on the vehicle and qualified as a valid code and it is then judged "YES"at Step S14. The procedure thus goes to Step S15 where it is examined whether or not the signal code received is the manual code sent from the entry key 50 by the manual switch operation for locking and unlocking the door. When it is judged "YES", the procedure advances to Step S16 where the manual operation is enabled (which is a process to interpret the code issued through the manual switch operation and will be explained in no more detail).

As the received code is the B code carried on a response signal to the response demand signal at present, it is judged "NO" at Step S15 and the procedure moves to Step S17 where it is examined whether the manual SW is turned on or not. When it is judged "YES" at Step S17, the procedure returns back to Step S2. As "NO" is given at Step S17, however, the procedure goes to Step S18 where the welcome function process for unlocking and locking the door in response to the result of the welcome code judgment is executed.

Welcome Function Process at Disembarkation

The welcome process at Step S18 in FIG. 4 will now be explained in more detail referring to FIGS. 9 and 10. It is assumed that the driver stops the engine, disembarks, and departs with the entry key from the vehicle. As described previously, the disembarkation of the driver is followed by Step S12 (FIG. 4) for selecting the transmission of the B small response demand signal and resetting the variable n to 0 and Step S13 for enabling the transmission of the B response demand signal with timer interruption. Then, the welcome process is commenced at Step S18 in response to the reception of the correct B code.

The welcome process starts with Step S171 where it is examined whether the signal code received from the entry key is the A code or not. In the beginning, since the A response demand signal is not transmitted it is judged "NO", allowing the procedure to goes to Step S201. When it is judged at Step S201 that the received code coincides with the right B code, the procedure moves to Step S202 where the BREC flag representing the reception of the B code is set to 1 while the number of consecutive receptions of the A code denoted by I is set to zero. Step S204 follows where the door is unlocked.

It is then examined at Step S209 whether the AREC flag is 1 or not. As the A code is not received by now, it is judged "NO". The procedure hence goes to Step S210 where the ATM flag is set to 1 for enabling the intermittent transmission of the A response demand signal. At Step S211, the variable n is set to 0. At Step S212, the timer interruption permitting bit for the I response demand signal is cleared off to inhibit the transmission of the I response demand signal. At Step S214, the BCHG flag is set to 0. While the B code only is received continuously, the above steps are repeated.

When the A code is released from the entry key in response to the reception of the A response demand signal and received by the vehicle, it is judged "YES" at Step S171. The procedure then goes to Step S172 where the AREC flag is set to 1 while the OUT flag and the RCHK flag are turned to 0 to register that the entry key 50 is within the communication area for the A response demand signal and reset the T-OUT timer. At next Step S173, the variable I indicating the number of consecutive reception of the A code is increased by 1 for updating (I is thus turned to 1). It is then examined at Step S174 whether or not the variable I is turned to 2 (for example). In the beginning, I is not 2 and the procedure jumps to Step S180.

It is examined at Step S180 whether the BSTM flag indicating the selection of the B small response demand signal is 1 or not. As the BSTM flag is 1 so far, it is judged "YES" and the procedure moves to Step S181 where it is examined whether the BCHG flag for causing the B response demand signal being switched from the B small to the B large is 1 or not. As the BCHG flag is now 0, the procedure goes to Step S182 for setting the BCHG timer to, for example, 30 seconds.

The setting time for the BCHG timer may be determined on the basis of experiments or actual measurements to a duration enough to allow the entry key to get away enough from the vehicle and step out of the communication area for the B large response demand signal. Then, the procedure moves to Step S184 where the BCHG flag is shifted to 1. It is then examined at Step S185 whether the BCHG timer is turned to zero or not. In the beginning, the timer is not zero and the procedure returns back to Step S2.

As the entry key steps out of the communication area for the B small response demand signal (FIG. 13), the B code is no more received but the A code is continuously received on the vehicle. Step S171 only of the welcome process repeats judging "YES". Accordingly, the variable I is updated to 2 at Step S173 and it is judged "YES" at Step S174. The procedure hence goes to Step S176 for locking the door.

When the A code is next received from the entry key, the procedure jumps from S174 to S180 and then from S181 to S185. As it is judged "NO" at Step S185 before the setting time (for example, 30 seconds) of the BCHG timer elapses, the procedure returns back to Step S2. When the setting time has elapsed, however, it is judged "YES" at Step S185.

As a result, the procedure advances to Step S186 where the BSTM flag for selecting the B small response demand signal is turned to 0. At Step S187, the BLTM flag for selecting the B large response demand signal is turned to 1. Accordingly, the transmission of the B large response demand signal is initiated by timer interruption. As the entry key is far enough away the vehicle and out of the communication area of the B large demand signal at the time, it is disabled to receive the B large response demand signal and sends back non of the B code.

As the entry key departs further from the vehicle, it is disabled to receive finally the A response demand signal and thus to release the A code. This causes Step S14 of the procedure to judge "NO" and the procedure moves via Step S15A shown in FIG. 4 to Step S30 shown in FIG. 5. Then, Block S41 follows in which the flags are examined at Steps S31 and S32 before the T-OUT timer is set to m seconds at Step S33, as described previously. As long as it is judged "NO" at Step S35, the procedure always restarts from Step S2.

Figure 5:
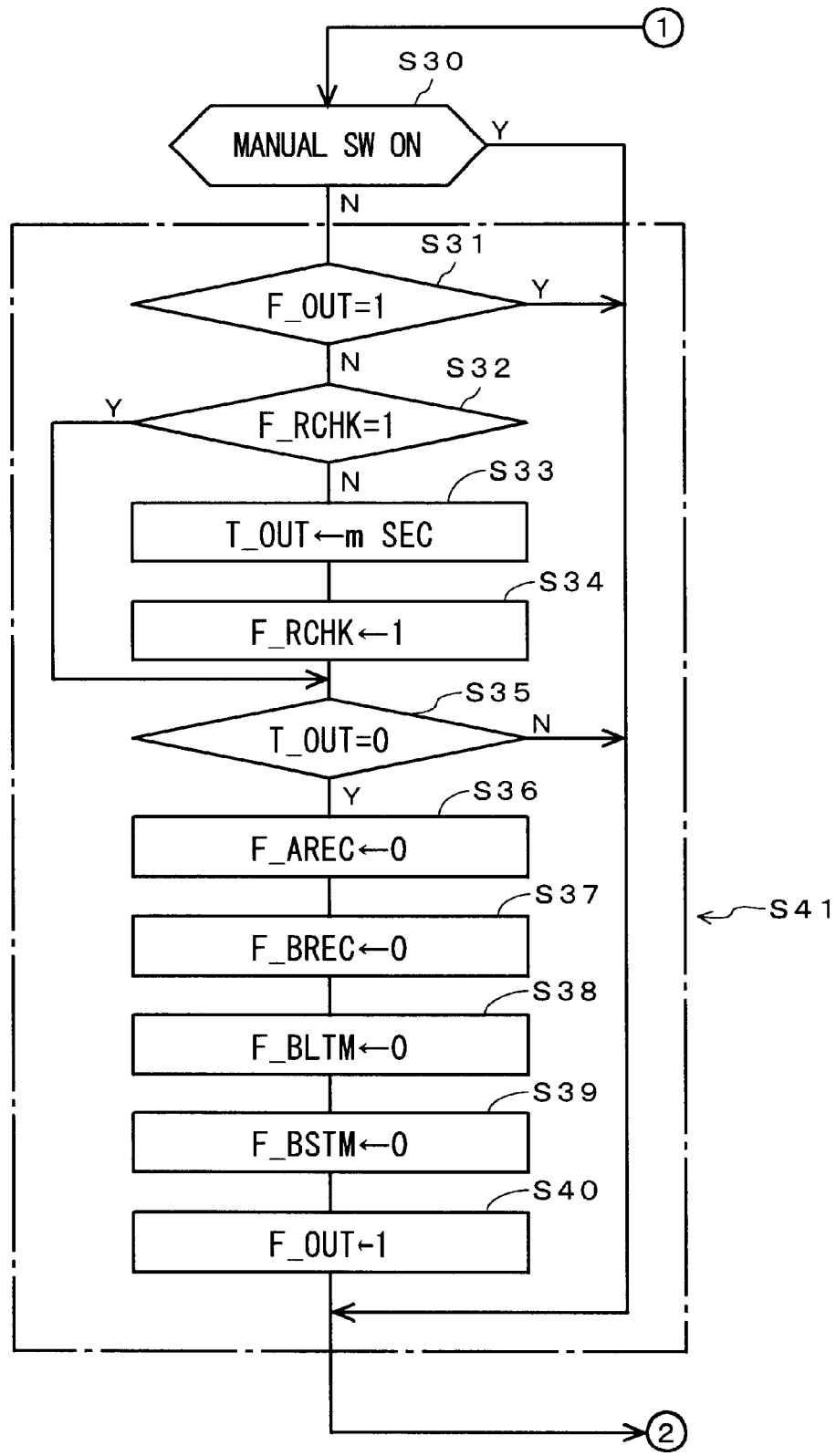
FIG. 5 is the remaining part of the main flowchart showing an action of the first embodiment of the present invention.

When the A code is no more sent back and it is thus judged "YES" at Step S35 after m seconds of the setting time on the T-OUT timer, i.e. any sent-back code from the entry key 50 is not received in a duration of m seconds, as illustrated in the flowchart of FIG. 5, the procedure moves to Steps S36 to S39 for initializing the AREC, BREC, BLTM, and BSTM flags to 0 which flags relate to the welcome process. The procedure then goes to Step S40 where the OUT flag is turned to 1 to register that the entry key 50 is out of the communication area for the A response demand signal. This is followed by the procedure returning back to Step S2 for repeating the steps.

As the BLTM and BSTM flags are set to 0 at the time, the procedure is after t8 in FIG. 3 and before t1 in FIG. 2 where the intermittent transmission of only the A response demand signal is executed. As apparent, the A response demand signal is not received by the entry key and its response signal carrying the A code is not sent back.

Welcome Function Process at Embarkation

A case of the driver with the entry key 50 approaching and embarking the vehicle will now be explained. As the entry key moves from a far enough point where the A response demand signal cannot be received to a near point within the communication area for the A response demand signal, it receives the A response demand signal and sends back the A code in response. When the A code is received by the vehicle, it is judged "YES" at Step S14 and the procedure goes to Step S15 for judgment whether the received code is the manual code or not.

When the judgment is affirmative, the procedure advances to Step S16 for executing the manual operation process. The received code is not assumed now to be the manual code and it is thus judged "NO" at Step S15. The procedure then moves to Step S17 where it is examined whether the manual SW is turned on or not. When so, the procedure returns back to Step S2. But it is now judged "NO" and the procedure goes to Step S18 for initiating the welcome process shown in FIG. 9.

In the welcome process, "YES" at Step S171 and "NO" at Step S174 are provided and the procedure jumps to Step S180. As "NO" is also given at Step S180, it is examined at Step S188 whether the BLTM flag is 1 or not. At the time, the BLTM flag is not 1 and procedure moves to Step S189 where the BLTM flag is shifted to 1 to select the transmission of the B large response demand signal. Then at Step S190, the variable n is set to 1. While only the A code is received from the entry key, the above steps are repeated (excepting that because "YES" is given at Step S188, Steps S189 and S190 are skipped). The A response demand signal and the B large response demand signal are thus transmitted at their respective intervals of time.

As the driver steps closer to the vehicle, the entry key is enabled to receive the B large response demand signal from the vehicle and send back the B code. When the B code is received by the vehicle, it is judged "NO" at Step S171 but "YES" at Step S201. Accordingly, the door is unlocked at Step S204. As the A code has been received at that time, "YES" is given at Step S209 and the transmission of the I response demand signal is inhibited at Step S212. At next Step S214, the BCHG flag is shifted to 0 to inhibit the switching of the response demand signal from the B large to the B small.

Figure 4:
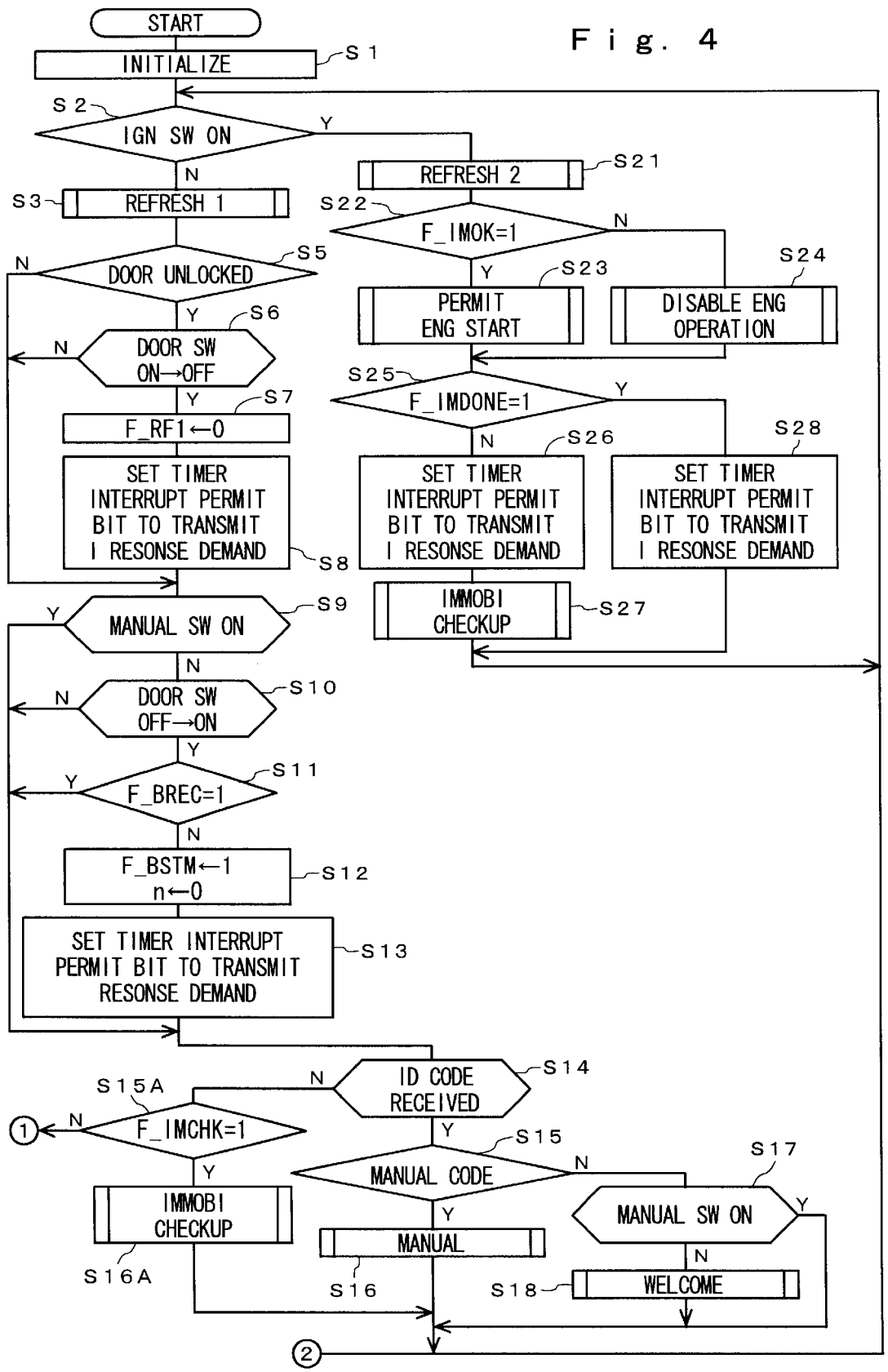
FIG. 4 is a part of the main flowchart showing an action of the first embodiment of the present invention.

As the driver opens the door, steps in the vehicle, and closes the door, it is judged "YES" at Step S6 (FIG. 4). Then, the timer interruption permitting bit for permitting the transmission of the I response demand signal is enabled at Step S8 to permit the timer interrupted intermittent transmission of the I response demand signal. At the time, the entry key is disabled to receive the A and B response demand signals (which are transmitted to only the outside of the vehicle) and hence, none of the A code and the B code are received by the vehicle.

The entry key 50 receives the I response demand signal and responds to send back the I code. When the I code is received by the vehicle, the procedure runs through Steps S14, S15, and S17 and enters at Step S18 the welcome process shown in FIG. 9. As it is judged " NO" at both Steps S171 and 201, the procedure advances to Step S221 shown in FIG. 10. A block denoted by the chained line SC in FIG. 10 is a known immobilizing process.

It is examined at Step S221 whether the IMDONE flag indicating the completion of the immobilizing checkup is 1 or not. At the time, the immobilizing checkup is not executed and the procedure goes to Step S222 for executing the immobilizing checkup. In the immobilizing checkup, the I code received is examined whether it is valid or not as will be explained later referring to FIG. 11. When so, the IMOK flag is turned to 1. Step S223 follows where the immobilizing checkup result is examined based on the IMOK flag whether or not it is all right.

When it is judged "NO" at Step S223, the operation of the engine is disabled at Step S227. When it is "YES", the procedure goes to Step S224 for permitting the start of the engine. At Step S225, the ATM flag is shifted to 0 and at Step S226, the AREC flag is shifted to 0. In the next cycle of receiving the I code, it is judged "YES" at Step S221. The procedure then moves to Step S228 where the timer interruption permitting bit for the I response demand signal is cleared off to prohibit the intermittent transmission of the I response demand signal.

The bit information of the IMOK flag is transferred via the communication line (bus) 32 to the FI-ECU 33 (See FIG. 1). In response to the bit of the IMOK flag, the FI-ECU 33 controls the action of a fuel pump, a fuel injector, a fuel feeder, and an ignition device (each not shown) in any known manner so that when the bit is 1, the engine is enabled and while when 0, the engine is disabled.

Figure 9:
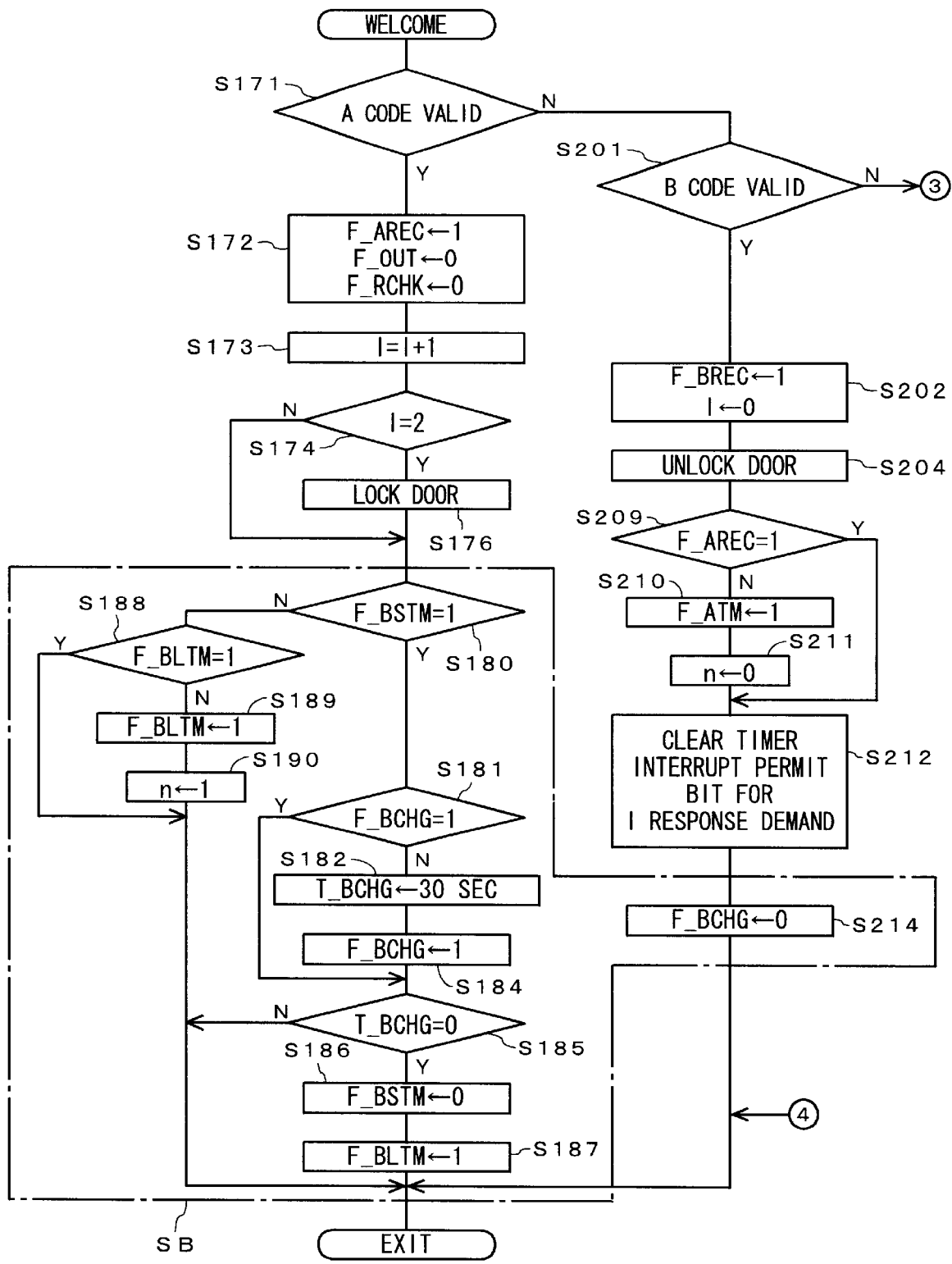
FIG. 9 is a flowchart showing a part of a welcome process in FIG. 4.

The blocks enclosed with the chain line SB in FIG. 9 are provided for assigning different levels of hysteresis to the communication area for the B response demand signals at the embarkation and the disembarkation, and selecting the B small response demand signal when the driver gets away from the vehicle for permitting the door locking at earlier timing and while the B large response demand signal when the driver approaches towards the vehicle for permitting the door unlocking at possibly earlier timing. It would hence be appreciated that when the hysteresis is not applied, the blocks for switching between the B small signal and the B large signal is unnecessary.

Figure 8:
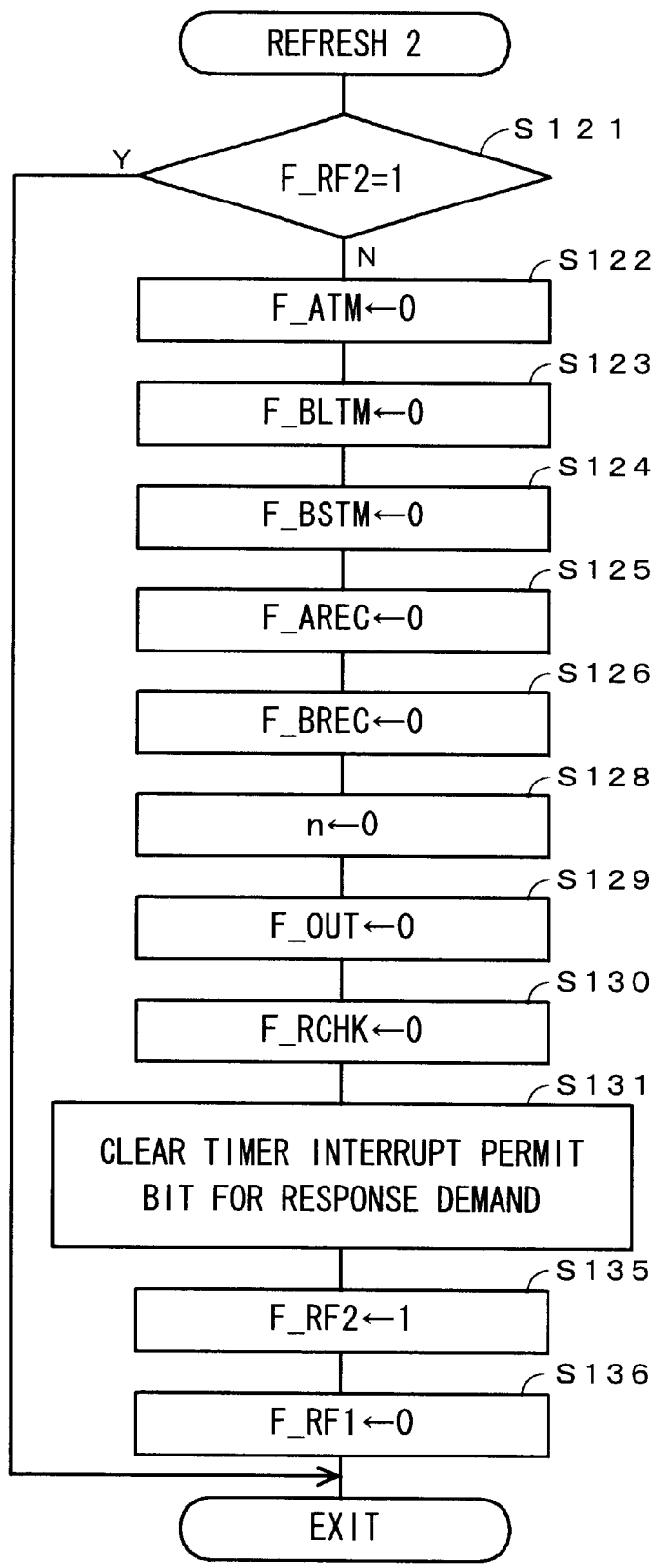
FIG. 8 is a flowchart showing a refresh 2 process in FIG. 4.

When the driver embarks and the IGN SW is turned on, it is judged "YES" at Step S2 in FIG. 4 and the procedure moves to Step S21 where a refresh 2 process for initializing the welcome function flags is executed as will be explained lately in more detail referring to FIG. 8. It is then examined at Step S22 whether the IMOK flag is 1 or not (i.e. the result of the immobilizing checkup is all right or not).

If it is judged "NO" at Step S22, the procedure goes to Step S24 for disabling the operation of the engine.

Figure 11:
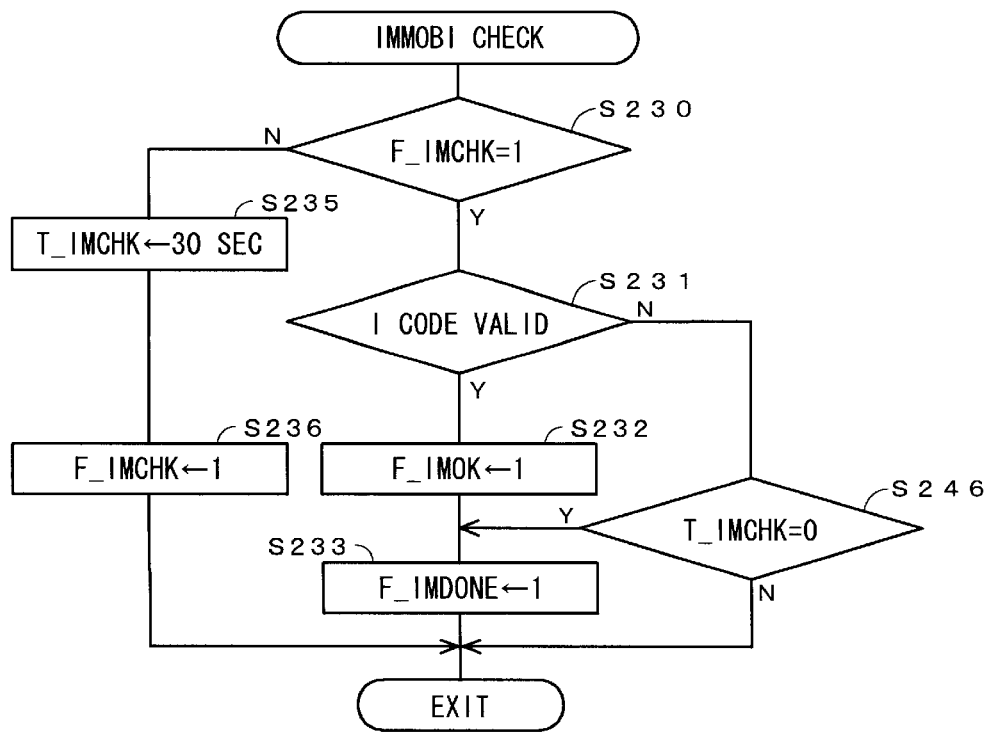
FIG. 11 is a flowchart showing an immobilizing checking process in FIG. 4.

It is then examined at Step S25 whether the IMDONE flag is 1 or not (i.e. the immobilizing checkup is finished or not). When judged "NO", the procedure moves to Step S26 where the timer interruption permitting bit for permitting the transmission of the I response demand signal is enabled similar to Step S8. Then, the immobilizing checkup process explained later in conjunction with FIG. 11 is executed at Step S27. The procedure goes from Step S2 to Step S22 thereafter. In the immobilizing checkup process, when the immobilizing code received by the vehicle is qualified to be judged that its key operation is correct, the IMOK flag is shifted to 1. It is hence judged "YES" at Step S22.

By now, the checkup is right and the procedure advances to Step S23 for enabling the start of the engine. As the IMDONE flag is set to 1 in the immobilizing checkup process mentioned above, "YES" is given at Step S25. The procedure then goes to Step S28 where the timer interruption permitting bit for the I response demand signal is cleared off to prohibit the transmission of the I response demand signal. During the running of the vehicle, the IGN SW remains turned on, the above steps are repeated.

When the IGN SW is turned to the ACC or OFF position to stop the engine, it is judged "NO" at Step S2. The procedure then moves to Step S3 for executing the above described process at the disembarkation.

Figure 6:
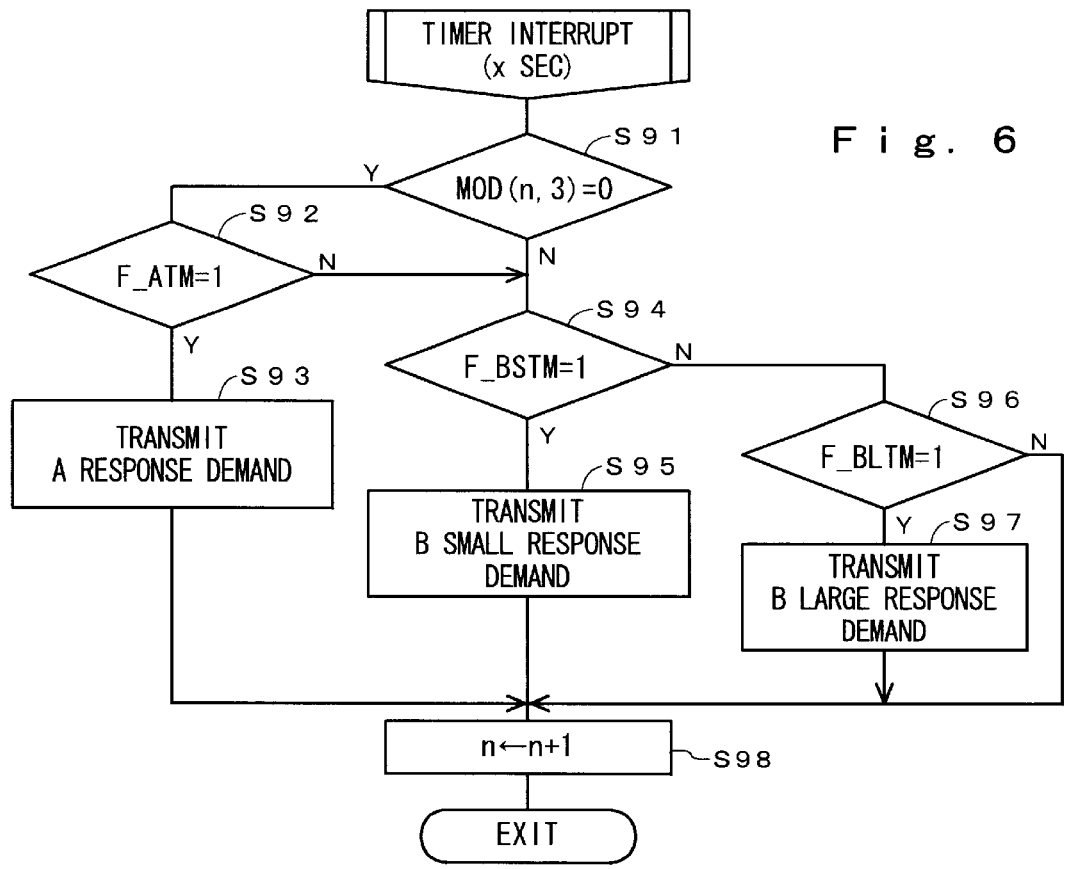
FIG. 6 is a flowchart showing the transmission of a response demand signal with timer interruption in the first embodiment of the present invention.

The transmission of the response demand signals in the welcome process will be explained referring to FIG. 6. This process is executed in every x seconds by the timer interruption to intermittently transmit the A or B (B large or B small) response demand signal, provided that the response demand signal transmission selecting flag is 1. The A, B large, and B small response demand signals may be selected as previously described referring to FIGS. 2, 3, and 13.

The procedure starts with Step S91 for examining whether MOD (n,3) is zero or not. MOD (n,3) is the remainder of the variable n divided by 3, which n is described previously concerning with Steps S190 and S211. When MOD (n,3) is zero, the procedure goes to Step S92 where it is examined whether the ATM flag is 1 or not. When so, the procedure goes to Step S93 for permitting the transmission of the A response demand signal.

When the remainder of n/3 is 1 or 2, it is judged "NO" at Steps S91 or S92 and the procedure moves to Step S94 where the BTSM flag is examined whether it is 1 or not. When so, the procedure goes to Step S95 for permitting the transmission of the B small response demand signal. When judged "NO" at Step S94, the procedure moves to Steps S96 for examining whether the BLTM flag is 1 or not. When so, the procedure advances to Step S97 for permitting the transmission of the B large response demand signal.

Figure 7:
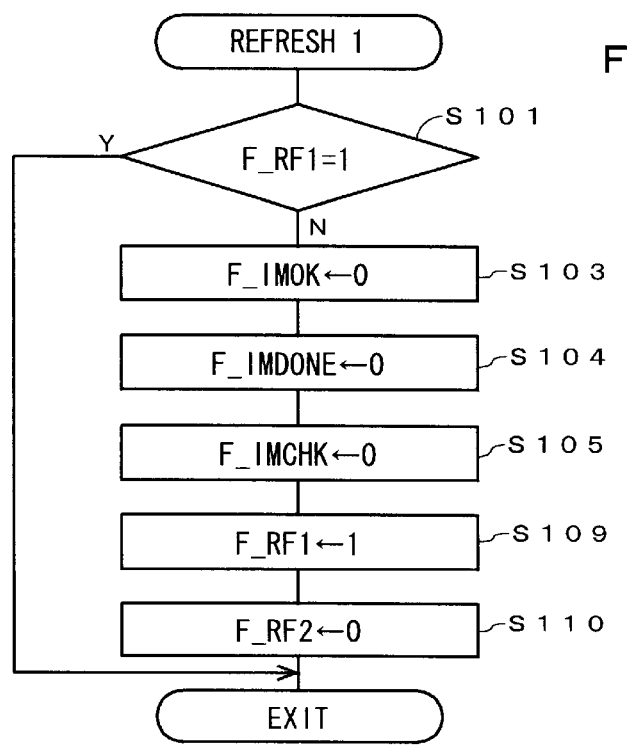
FIG. 7 is a flowchart showing a refresh 1 process in FIG. 4.

The refresh 1 process at Step S3 (FIG. 4) will now be explained referring to FIG. 7. At Step S101, the RF1 (refresh 1) flag is examined whether or not it is 1 as indicating that the refresh 1 process is completed. When judges "YES", i.e. the refresh 1 process is completed, the procedure jumps to EXIT. In the beginning, it is judged "NO". At next Step S103, the IMOK flag is shifted to 0 and at Step S104, the IMDONE flag (immobilizing checkup is done) is shifted to 0. At Step S105, the IMCHK flag (immobilizing checkup is started) is reset to 0.

As the result, the initialization of the immobilizing checkup flags is completed. At Step S109, the RF1 flag a is turned to 1 to register that the refresh 1 process has been done. At Step S110, the RF2 flag is turned to 0 to register that the refresh 2 process is not yet done.

The refresh 2 process at Step S21 (FIG. 4) will be explained in more detail referring to FIG. 8. At Step S121, the RF2 flag is examined whether it is 1 or not, i.e. the refresh 2 process has been done or not. When "YES", the procedure jumps to EXIT. When judged "NO", the procedure runs through Steps S122, S123, and S124 for resetting the ATM, BLTM, and BSTM flags to 0, respectively. Those steps are to inhibit the transmission of the A, B large, and B small response demand signals, respectively.

This is followed by Steps S125 and S126 for resetting the AREC and BREC flags to 0, respectively. These two steps are provided for registering that the code, which is included in a response signal send back from the entry key 50 in response to the reception of the demand signal transmitted from the vehicle, is not yet received by the receiver on the vehicle. At Step S128, the variable n for determining the response demand signal to be transmitted is turned to zero.

At Step S129, the OUT flag is shifted to 0 (denied) for indicating that the entry key 50 is out of the communication area of the A response demand signal. At Step S130, the RCHK flag is set to 0 to indicate that the T-OUT timer is not started which sets the limited time for detecting whether or not the entry key 50 is out of the communication area for the A response demand signal. At Step S131, the timer interruption permitting bit for the response demand signal is cleared off to inhibit the timer interrupted transmission.

After the above steps, the initialization of the welcome function flags are completed. Then, Step S135 follows where the RF2 flag is turned to 1 to register the completion of the refresh 2 process. At Step S136, the RF1 flag is reset to 0 for registering the non-completion of the refresh 1 process.

The immobilizing checkup process at Step S222 (FIG. 10) will be explained in more detail referring to FIG. 11. The immobilizing checkup process starts with Step S230 for examining whether the IMCHK flag for indicating the starting of the immobilizing checkup process is 1 or not. When the immobilizing checkup process is not started and "NO" is given, the procedure moves to Step S235 for setting the immobilizing checkup timer T-IMCHK to a desired immobilizing checkup period (for example, 30 seconds) At Step S236, the IMCHK flag is shifted to 1.

When the immobilizing checkup process has been started and it is judged "YES" at Step S230, the procedure advances to Step S231 for examining whether or not the immobilizing code I sent back from the entry key is identical to the code previously saved in a memory on the vehicle. When so, the procedure goes to Step S232 where the IMOK flag is turned to 1 to indicate the confirmation of the immobilizing code comparison and Step S233 follows. Those steps allow the FI-ECU 33 to positively control the operation of the engine as described previously.

When judged "NO" at Step S231, the procedure goes to Step S246 for examining whether the IMCHK timer is timed up or not. When not, the immobilizing checkup process is terminated. When judged "YES" at Step S246, the procedure goes to Step S233. At Step S233, the IMDONE flag indicating that the immobilizing checkup process has been done is turned to 1.

Figure 12:
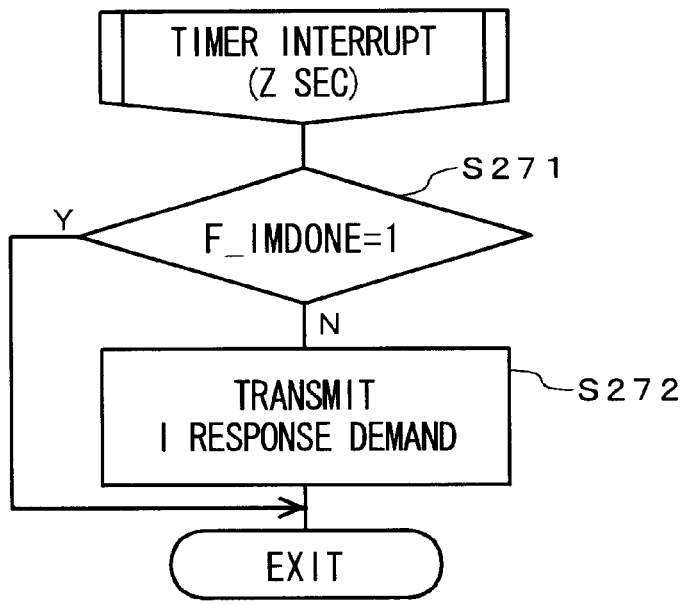
FIG. 12 is a flowchart showing the transmission of an I response demand signal with timer interruption in the first embodiment of the present invention.

FIG. 12 illustrates the intermittent transmission of the I response demand signal with the timer interruption permitting bit for the I response demand signal being enabled, where the timer interruption may be carried out in every z seconds. The procedure starts with Step S271 for examining based on the IMDONE flag whether the immobilizing checkup process is done or not. If not, the procedure goes to Step S272 for permitting the transmission of the I response demand signal. When the immobilizing checkup process has been done and it is judged "YES" at Step S271, the procedure is terminated.

According to the embodiment mentioned above, only when the entry key sends back a signal in response to reception of the A response demand signal transmitted from the vehicle at longer intervals in the wider communication area, and the signal thus sent back is received by the receiver on the vehicle and confirmed to be correct response signal through the welcome code examination, the B response demand signal for the smaller communication area is transmitted at least once in the period of transmitting two of the A response demand signals. In other words, even if any other person or object not carrying the entry key and unrelated to the vehicle moves into the A (response demand signal communication) area shown in FIG. 13, the transmission of the B response demand signal is not executed.

Accordingly, the occasion of transmitting the B response demand signal for actually controlling the unlocking and locking action of the door is minimized, hence decreasing the power consumption of the vehicle battery. Also, the interval between transmitting timings of two response demand signals is significantly minimized, thus allowing the position of the entry key relative to the vehicle to be more accurately identified. As a result, the transmission of the B response demand signal at intervals of an optimum period and in an optimum or relatively smaller size of the communication area can be executed without largely increasing the power consumption thus to precisely control the vehicle mounted components, for example, the automatic unlocking and locking action of the door of the vehicle, corresponding to the distance between the entry key and the vehicle. More particularly, the precise control over the vehicle mounted components with the entry key can successfully be conducted in compatibility with the favorable energy saving.

The foregoing embodiment is based on the use of the B response demand signals common to all the doors of a vehicle in conjunction with their response signals. In that case, it may happen that when the entry key steps in such a predetermined communication area as denoted by the B (large) in FIG. 13, all the doors are unlocked at same time.

Figure 14:
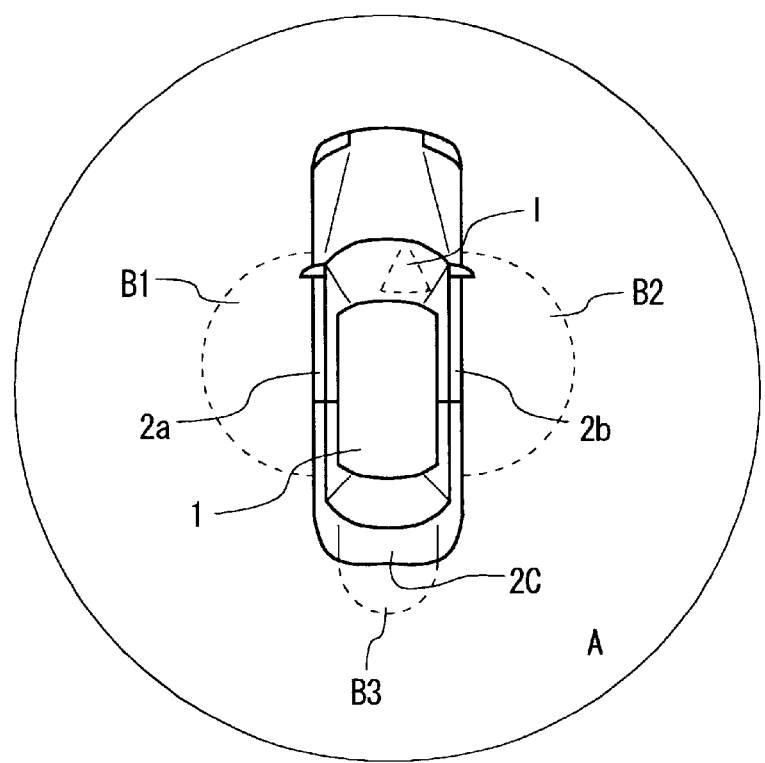
FIG. 14 is a schematic view showing the relation between the control operations and the distance from the vehicle to the entry key in another embodiment of the present invention.

For avoiding such an event, an alternative embodiment is provided as shown in the schematic view of FIG. 14 where three different B response demand signals B1, B2, and B3 respectively assigned to two of left and right doors 2a, 2b and a rear trunk door 2c are provided. For example, when any one of the three B response demand signals is not received, all the doors are locked simultaneously. On the other hand, desired one of the doors can be unlocked by the controlling action of a vehicle mounted receiver which receives a B code for the desired door included in a response signal to the B response demand signal assigned to the desired door.

It should be understood by those skilled in the art that for applying the B response demand signals assigned to their respective doors, Step S201 in the flowchart of the welcome process shown in FIG. 9 may be modified to examine the received code for its matching with an unique code assigned to the desired door. Hence, the modification of the flowchart will be explained in no more detail. It is also appreciated that different levels of the hysteresis may be allocated to the sizes of the communication areas between the unlock and lock operation.

Figure 15:
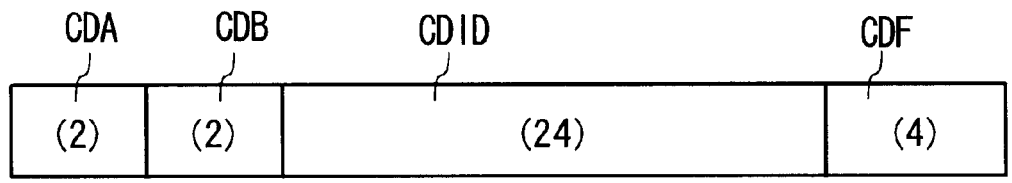
FIG. 15 is a diagram showing an exemplary format of the response demand signals preferably applicable to the present invention.

FIG. 15 illustrates an exemplary format of the response signal applicable to the above- and under-mentioned embodiments of the present invention. As shown, CDA is a start bit, CDB is an identification code, CDID is an ID code uniquely assigned to each vehicle, and CDF is a function code. The figures in the parenthesis represent the numbers of bits of the codes. In general, the ID code is used for examining if an entry key is authentic, while the function code is for discriminating the A and B codes from each other. The function code may be comprised of four bits, respectively; for example, the A code is [1000], the B code [1001], the manual lock code [1100], and the manual unlock code [1101], respectively in the case of FIG. 13, while the A code is [1000], the B code for the driver's door [1001], the B code for the passenger's door [1010], and the B code for the trunk door [1011] in the case of FIG. 14.

Figure 16:
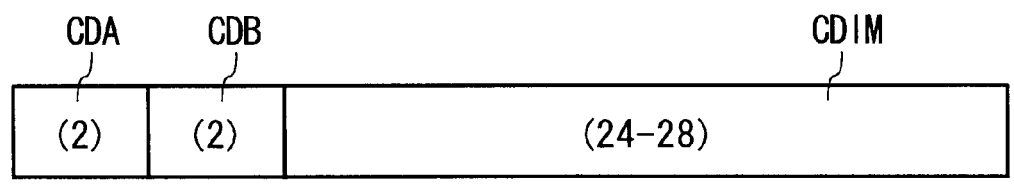
FIG. 16 is a diagram showing an exemplary format of the response signal for immobilizing operation preferably applicable to the present invention.

FIG. 16 illustrates an exemplary format of the response signal for the (anti-thief) immobilizing function applicable to the embodiments of the present invention. As the code comparison for the immobilizing function is extremely important for ensuring the anti-thief action as well known, it may preferably be differentiated in the structure from the other codes. As shown, CDA is a start bit, CDB is an identification code, and CDIM is an immobilizing function ID code. It is also possible to have all types of the response signals designed to a single particularly structured format.

Although the hysteresis characteristic is assigned to the communication areas for the B response demand signal between the unlock mode and the lock mode, the present invention is not limited to always have the hysteresis characteristics. The B large response demand signal and the B small response demand signal shown in the schematic view of FIG. 13 and the timing charts of FIGS. 2 and 3 may be a single and common B response demand signal.

Figure 17:
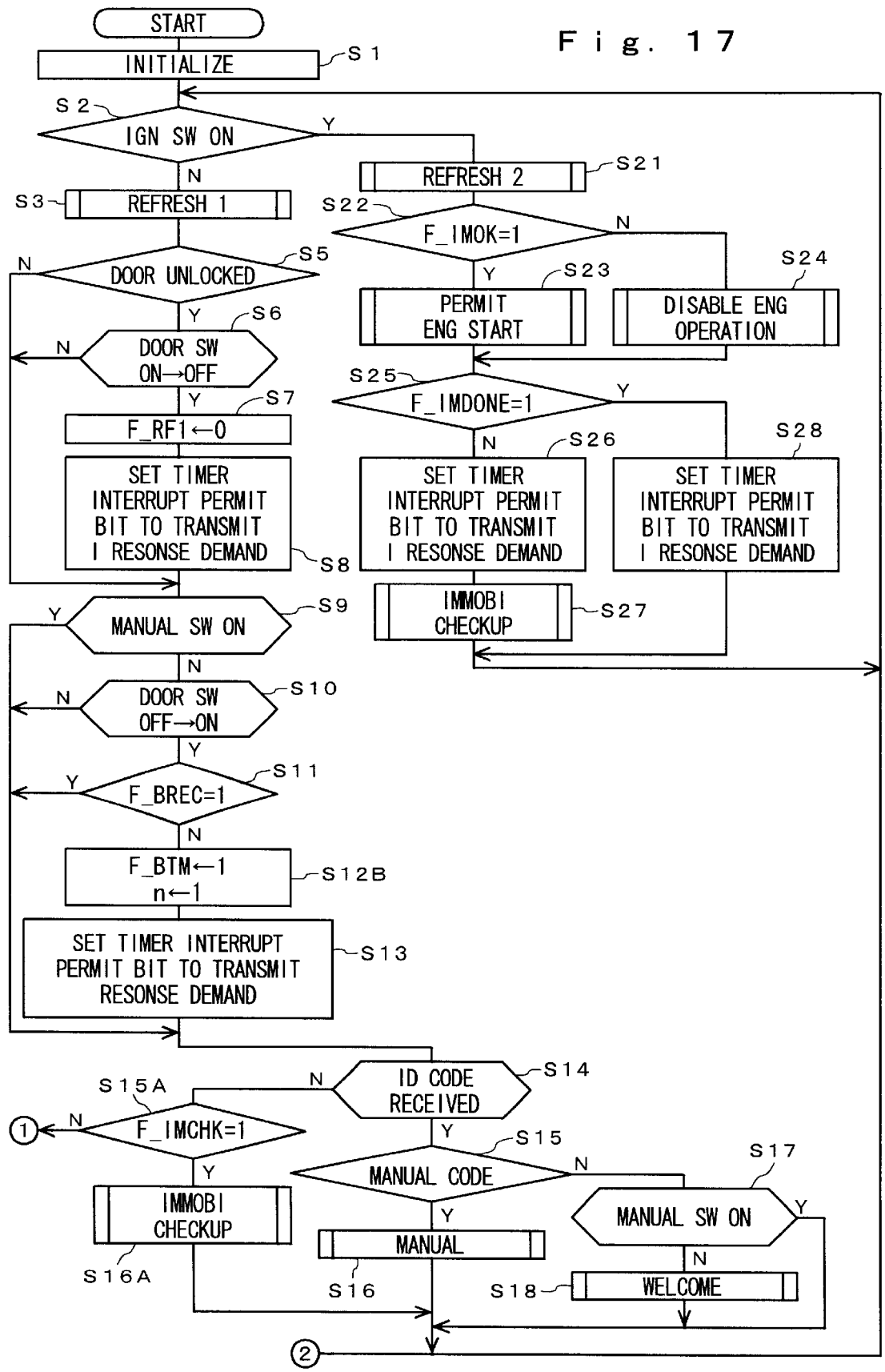
FIGS. 17 and 18 are main flowcharts showing the action of a further embodiment of the present invention as combined.
Figure 18:
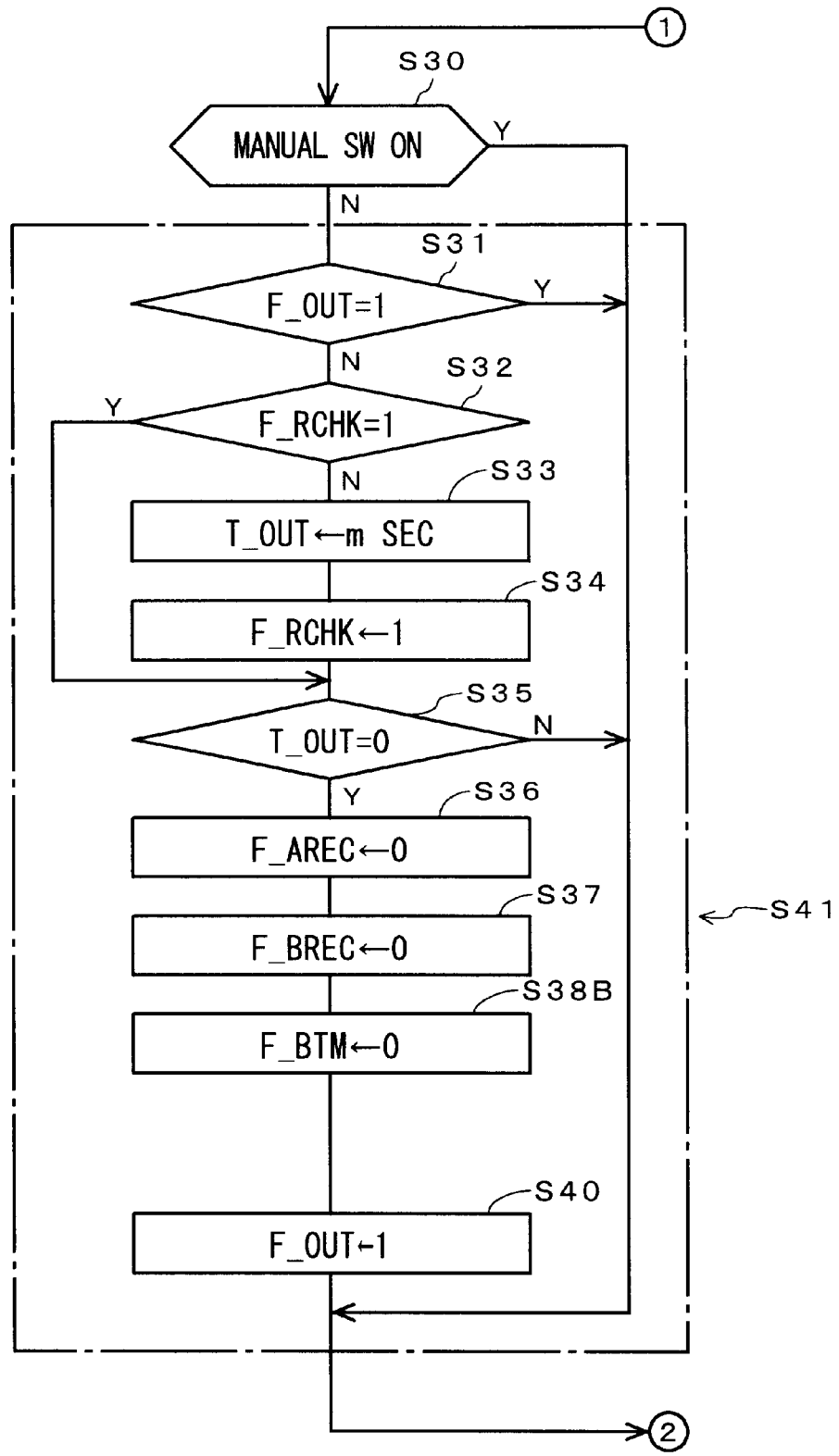
Figure 19:
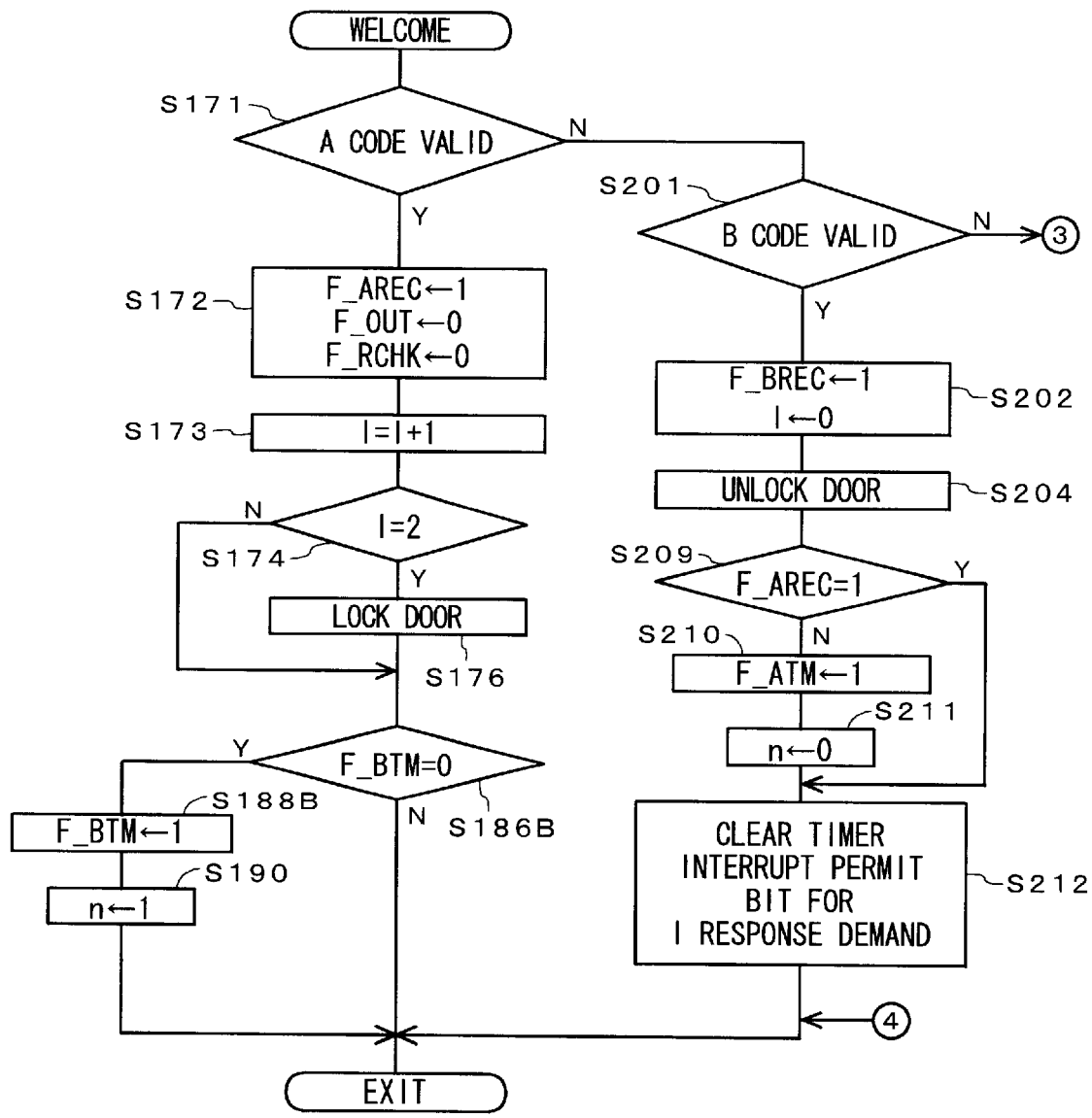
FIG. 19 is a flowchart showing a part of a welcome process in FIG. 17.

As for a further embodiment of the present invention using the single and common B response demand signal, a flowchart of its main procedure (corresponding to FIGS. 4 and 5) is shown in FIGS. 17 and 18 while a flowchart of its welcome function process (corresponding to FIG. 9) is shown in FIG. 19. Throughout the figures, like components are denoted by like numerals as those shown in FIGS. 4, 5, and 9 and will be explained in no more detail but only different steps or blocks will be explained below.

At Step S12B in FIG. 17, the B response demand signal selecting flag BTM is shifted to 1 for enabling the timer interrupted transmission of the B response demand signal. At Step S38B in FIG. 18, the flag BTM is reset to 0 to inhibit the transmission of the B response demand signal. Step S186B in FIG. 19 is provided for examining whether the flag BTM is 0 or not. The flag BTM is turned to 1 at Step S188B to permit the transmission of the B response demand signal, preparing for unlocking of the door as the driver comes towards the vehicle. When the entry key departs further from the vehicle and it is disabled to receive even the A response demand signal, the intermittent transmission of the A response demand signal only is maintained as described with the previous embodiment.

As the entry key 50 comes close to the vehicle, it receives the A response demand signal and sends back the A code. When the A code is received by the vehicle mounted receiver, it is judged "YES" at Step S171, "NO" at Step S174, and "YES" at Step S186B similar to those of the previous embodiment. Accordingly, Step S188B permits the transmission of the B response demand signal. The succeeding procedure may clearly be understood from the forgoing descriptions.

Figure 20:
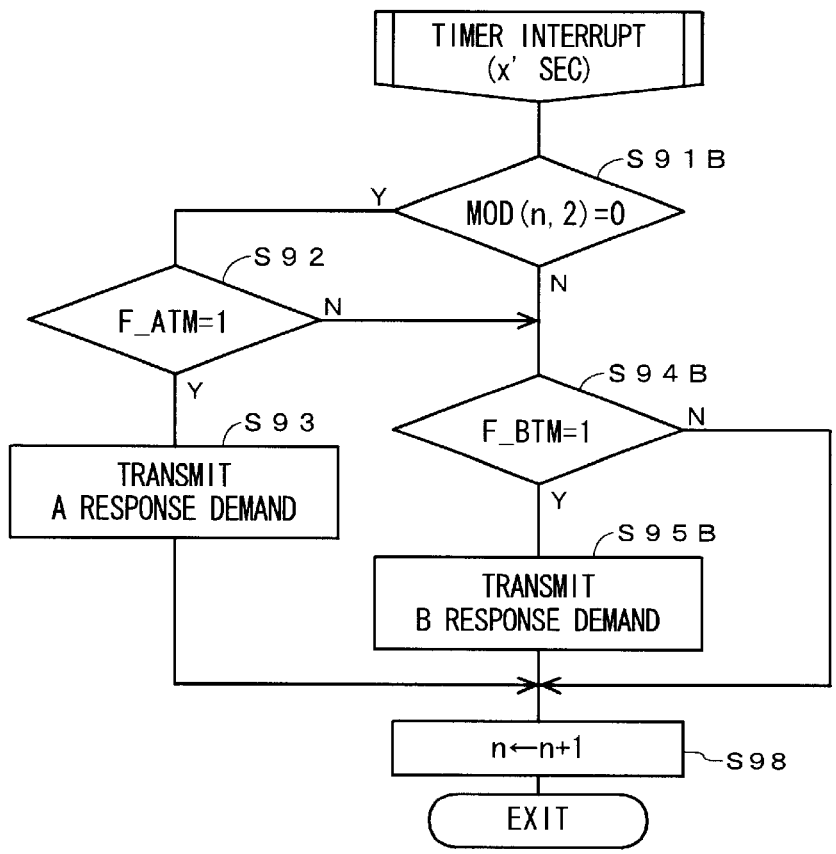
FIG. 20 is a flowchart showing the transmission of the response demand signal with timer interruption in a further embodiment of the present invention.

FIG. 20 is a flowchart showing the timer interrupted transmission of the A and B response demand signals executed in the welcome process of this embodiment. This drawing is similar to FIG. 6 in which like blocks are denoted by like numerals as those shown in FIG. 6 and they will be explained in no more detail. It is examined at Step S91B whether MOD (n, 2) which is the remainder of n/2 is zero or not (i.e. n is an odd number or an even number). When judged "NO" or n is an odd number, the procedure goes to Step S94B for examining whether the flag BTM for permitting the timer interrupted transmission of the B response demand signal is shifted to 1 or not.

When so, the transmission of the B response demand signal is permitted at Step S95B and procedure moves to Step S98. When it is judged "NO" at Step S94B, n is updated at Step S98 before the procedure of this process is terminated. The divisor such as 2 or 3 used at Steps S91B and S91 may preferably be determined so that the transmission of the response demand signals is timed favorably with the interval of the timer interruption settings (x or x' seconds).

Figure 21A:
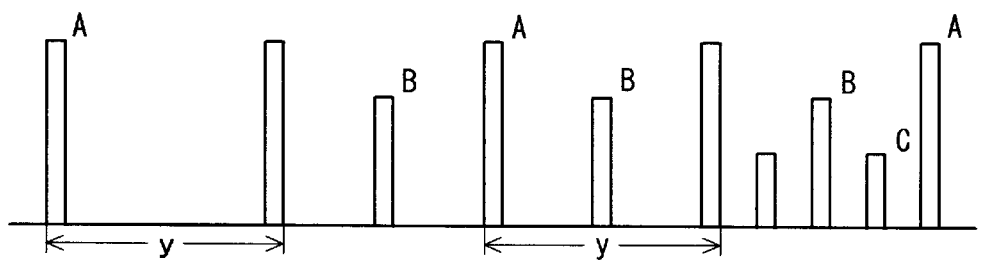
FIGS. 21A and 21B are a timing chart showing the transmission of the response demand signal in a still further embodiment of the present invention as combined.
Figure 21B:
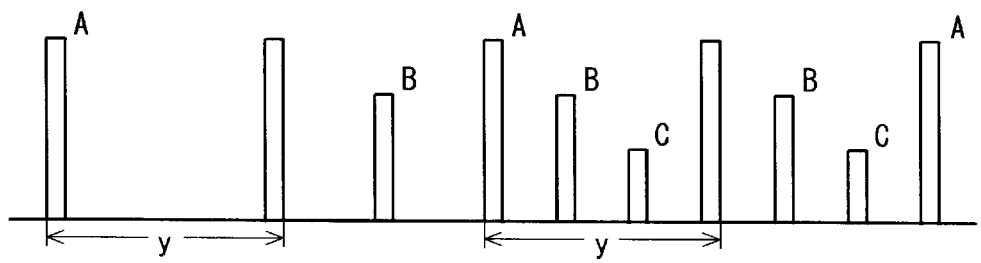

Although the response demand signal transmitted from the vehicle mounted receiver is classified into two different types, A and B, for the wider and the narrower communication areas respectively in the previous embodiments, the prevent invention may employ three or more types of the response demand signals for different sized communication areas. FIGS. 21A and 21B are timing charts illustrating the transmission of three different types of the response demand signal.

As shown, while the A response demand signal for the widest communication area is transmitted at intervals of the longest period y, the B response demand signal for the second widest communication area is transmitted, for example, at every intermediate moment between two adjacent transmitting timings of the A response demand signal, provided that the A code is received by the vehicle, indicating that the A response demand signal is successfully received by the entry key which is moving towards the vehicle.

The C response demand signal for the smallest communication area is also transmitted at every intermediate moment between the A response demand signal and the B response demand signal, provided that the B code is received indicating that the B response demand signal is successfully received by the entry key which is moving towards the vehicle. Those codes in the response signals may be expressed as, for example, the A code [1000], the B code [1001], the C code [1011] and the I code [0101].

On the other hand, when the driver disembarks and the entry key departs from the vehicle, the response signal responding to the C response demand signal for the smallest communication area will first become impossible of being received, then the response signal to the B response demand signal for the medium sized communication area, and finally the response signal to the A response demand signal for the widest communication area. The interval between two adjacent receptions of the response signals will thus be increased step by step.

In this embodiment, the response signal carrying the response code (one of the A, B, and C codes) is send back from the portable transmitter/receiver of the entry key corresponding to which one of the response demand signals for the communication areas of different sizes is received by it, hence allowing the control unit on the vehicle to intimately identify the location of the entry key relative to the vehicle. Accordingly, the vehicle mounted components can favorably be controlled depending on the distance from the vehicle to the entry key determined on the basis of the code in the response signal sent back.

As will be understood from the timing chart of FIGS. 21A and 21B, the response codes are received at intervals of a shorter period or at a higher rate of frequency from the entry key which is in a position closer to the vehicle. The location of the entry key relative to the vehicle can thus be identified by measuring the receiving cycle or frequency of the response codes on the vehicle. Also, as the entry key is in the position closer to the vehicle, the receiving cycle will be expected to be shorter thus possibly making the response action of the vehicle mounted components quicker.

Although the above-mentioned embodiments include transmitting from the vehicle mounted transmitter different types of the response demand signals which are different in the size of the communication area and the characteristics, sending back from the entry key the response codes corresponding to the type or the communication area of the response demand signal received, and identifying on the basis of the received response code the location of the entry key relative to the vehicle, the different types of the response demand signals may be designed uniformly in the characteristics and their response codes for simplification of the signal structure, when they are transmitted from the vehicle mounted transmitter at their respective frequencies or repetitive cycles different each other in their corresponding sizes of the communication areas as shown in FIGS. 21A and 21B.

Subsequently, the distance of the entry key from the vehicle can successfully be identified from the receiving intervals, the frequencies, or repetitive cycles of the response signal (response code) received by the vehicle mounted receiver and used for favorably controlling the operation of the vehicle mounted components according to the distance identified. An embodiment of the above modification will now be described referring to FIGS. 22 and 23. In these two graphs, the height of the different types of the response demand signals WS and WL represents only the intensity of the signal which is the size of the corresponding communication area.

FIG. 22 is a time chart showing schematically the actions when the driver carrying the entry key disembarks and walks away from the vehicle. As the vehicle 1 stops, the IGN SW is turned at t1 from the ON position to the ACC position and the door is opened at t2 by the driver for disembarkation. Then, the door SW is shifted from the OFF (open) position to the ON (close) position. This triggers the transmission of the W small response demand signal WS for a narrow communication area. The W small response demand signal WS is transmitted from the vehicle mounted transmitter at the predetermined intervals of 2u.

When the entry key 50 steps out from the vehicle and is enabled to receive the W small response demand signal WS, it releases a response signal carrying the W code (referred to as W code hereinafter). As the W code is received and the welcome code comparison is confirmed at t3, a first timer TWR1 for the receiving interval is set to a period v and then initiated. Simultaneously, the intermittent transmission of the W large response demand signal WL is initiated, of which the communication area is greater than that of the W small response demand signal (i.e. the transmitting output is higher while the other characteristics are identical to WL).

In this embodiment, the W large response demand signal WL is transmitted at every intermediate moment between two transmitting timings of the W small response demand signal WL and hence at the intervals equal to 2u seconds as illustrated. The setting time v of the timer may preferably be equal to the minimum transmitting interval (u) between the adjacent two response demand signals WS and WL.

This setting is preferable but not necessary. It is simply required to transmit the two response demand signals WS and WL alternately and more generally, to clearly discriminate the difference between an interval of transmitting timings when only the W large response demand signal WL is transmitted and the other interval when both of the W large and small response demand signal WL and WS are transmitted (preferably, the latter is shorter) In practice, the setting time v may preferably be set to (u+Δu) seconds considering various unevenness in the system.

As the welcome code comparison is confirmed at t4 with the W code received, a second timer TWR2 for the receiving interval is set to v and initiated. Simultaneously, it is examined whether the first timer TWR1 is timed up or not. As apparent from the criteria for setting the two timers, the two timers are not timed up while the W large and small response demand signal WL and WS are successfully received by the entry key which in turn releases their corresponding response signals W.

As the entry key 50 departs further from the vehicle and receives no more the W small signal WS, the vehicle mounted receiver is disabled to receive its response signal. One of the timers TWR (namely, the second timer TWR2 in this case) is then timed up to be turned to zero at t5. As the W code responding to the W large response demand signal is received and the welcome code comparison is confirmed at t6, the first timer TWR1 is restarted and the time up of the second timer TWR2 is acknowledged.

It is hence determined that the receiving interval of the W code is longer than v, i.e. the entry key is out of the communication area of the W small response demand signal WS, allowing the door of the vehicle to be locked. When the W code is not received within m seconds of the preset time after the locking action, the transmission of the W small response demand signal WS is stopped and the intermittent transmission of only the W large response demand signal WL is continued.

Referring to FIG. 23, the actions when the driver comes towards the vehicle 1 and its location is detected will be explained. When the entry key is out of and significantly distanced from the vehicle with the door locked in its disembarkation or parking mode, the W large response demand signal WL for the wider communication area is being transmitted at the predetermined intervals (of 2u seconds) from the vehicle as described previously and shown at the left most portion in FIG. 23. As the driver carrying the entry key steps into the communication area of the W large response demand signal WL about the vehicle, the entry key receives the W large response demand signal WL at t1.

Then, the entry key send back the W code responding to the reception of the W large response demand signal WL. As the W code is received by the vehicle and determined at t2 by the welcome code comparison that it is valid, the vehicle mounted control unit starts the first timer TWR1 for the receiving interval and simultaneously transmits the W small response demand signal WS at the equal interval (of 2u) and at every intermediate moment between two adjacent transmitting timings of the W large response demand signal WL.

When the W code which is released from the entry key responding to reception of the W large response demand signal at t3 prior to the reception of the W small response demand signal WS is received and judged by the welcome code comparison that it is valid, the second timer TWR 2 for the receiving interval is started. At the time, the first timer TWR1 is timed up and the door is not unlocked.

As the entry key 50 comes close enough to receive the W small response demand signal WS, it releases the corresponding W code. Upon the W code received and judged that it is valid, the second timer TWR2 is started at t4 and it is determined that the first timer TWR1 is not timed up. Then, the door of the vehicle is unlocked. When the door is opened (the door SW turned on) and then closed at t5, it is determined that the driver is in the vehicle. Then, the transmission of the I (immobilizing) response demand signal is initiated for its communication area limited within the vehicle (not shown in FIG. 23).

As the entry key releases the immobilizing code (I code) in response to the I response demand signal, the immobilizing code is received and examined by the vehicle. When it is judged that the I code is valid, the transmission of the I response demand signal is stopped thus enabling the start of the engine. As the ignition SW is turned to the ON position at t6, the transmission of both the response demand signals WL and WS is stopped and simultaneously the refresh 2 process is initiated as will be explained later.

The transmission of the response demand signals WL and WS may be stopped when it is judged that the I code is valid.

The response demand signal is not limited to the two types, WL and WS, and may be classified into three or more types which are different from each other in the size of the communication area and the transmitting interval.

A detailed procedure of this embodiment will now be described referring to its main flowcharts of FIGS. 24 and 25 and its welcome process flowchart of FIG. 26. In these drawings, the contents of process in blocks denoted by same numerals are identical to those in FIGS. 4, 5, and 9 and will be explained in no more detail but their different aspects.

Figure 24:
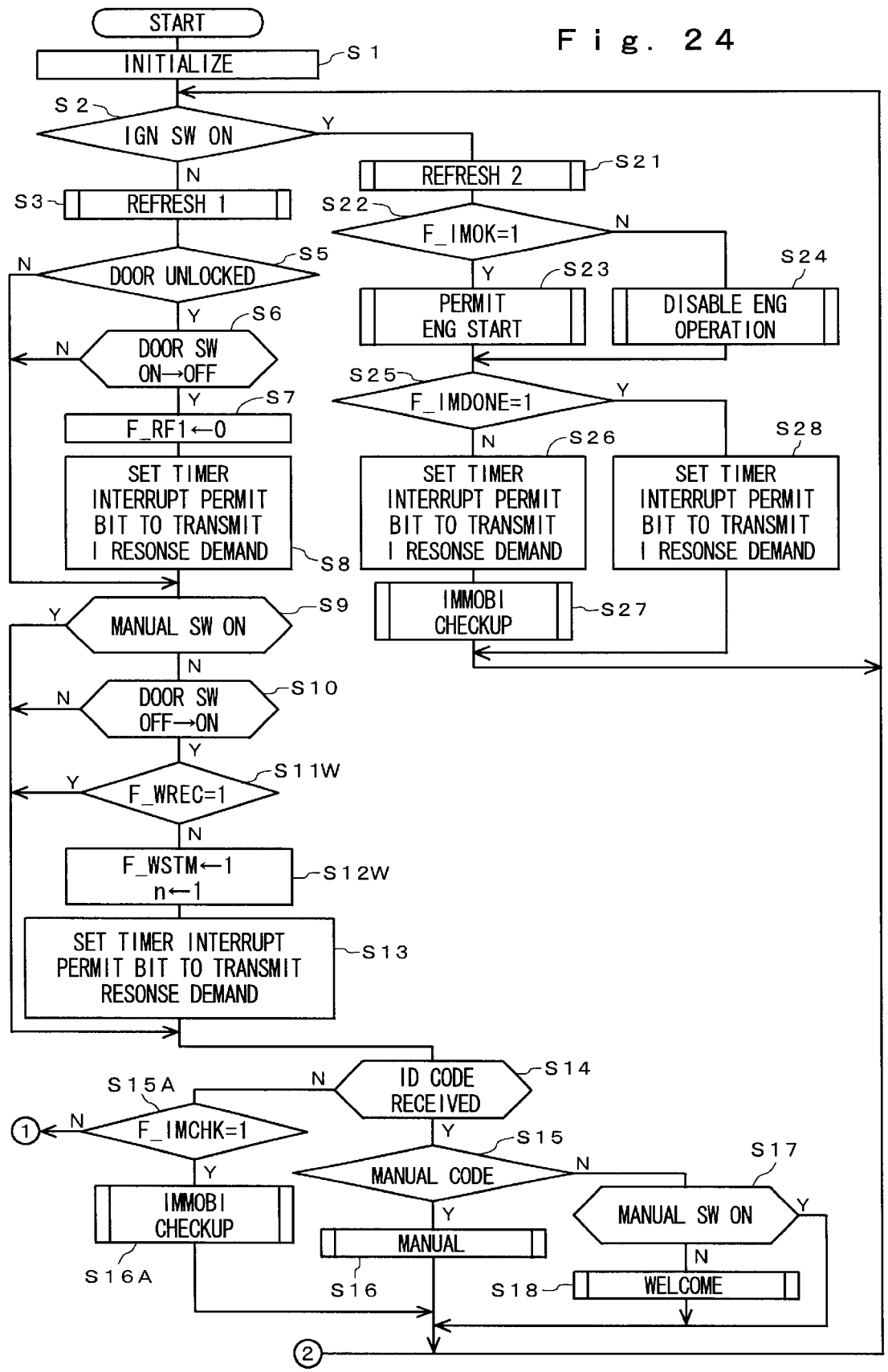
FIGS. 24 and 25 are main flowcharts showing in a combination the action of the still further embodiment shown in FIGS. 22 and 23.
Figure 25:
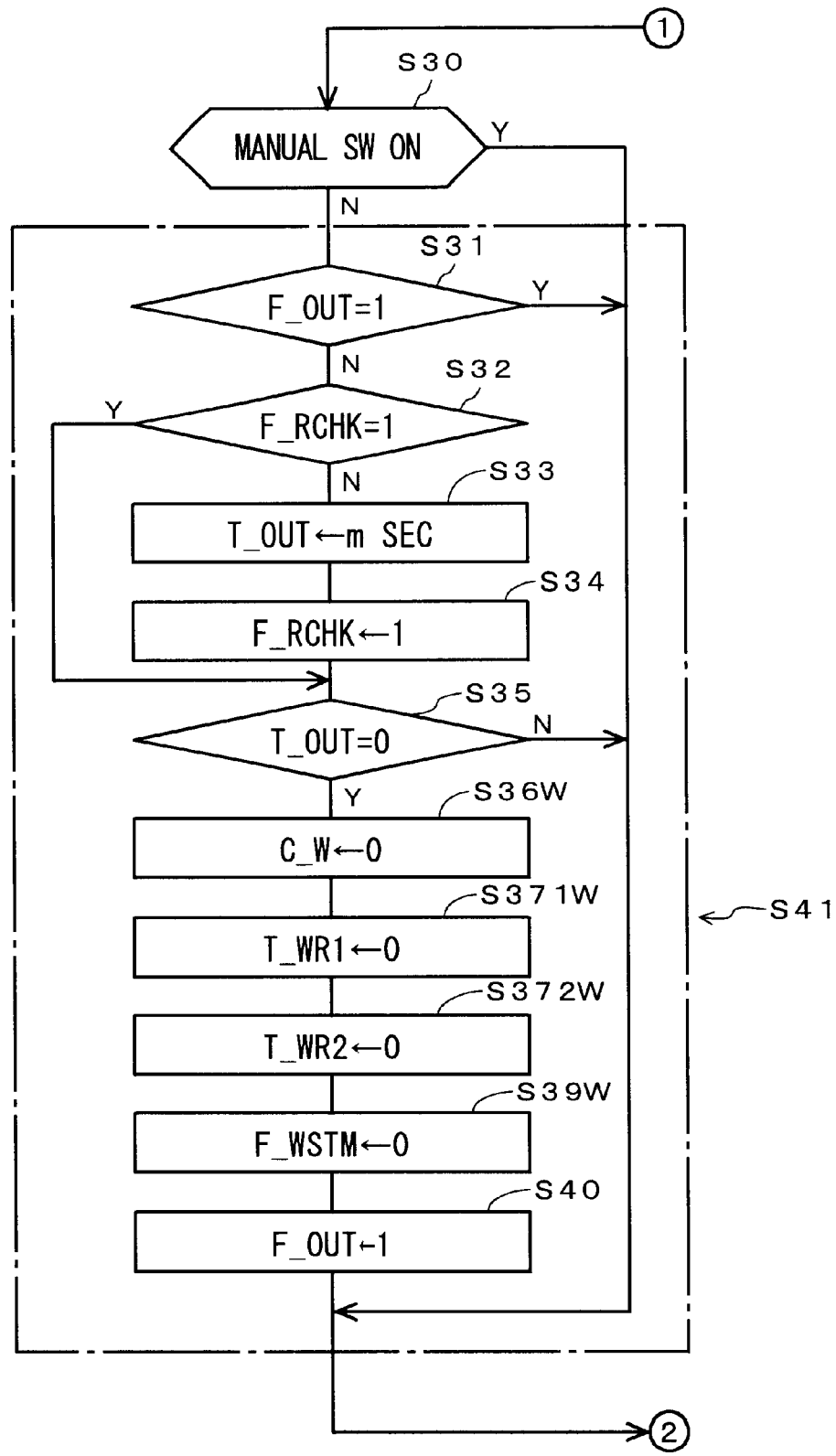

Referring to FIG. 24, when the driver opens the door for disembarkation, the procedure goes from Step S10 to Step S11W for examining whether the WREC flag is 1 or not, i.e. the W code is received or not from the entry key 50. At the disembarkation, this step judges "NO" and the WSTM flag is turned to 1 at Step S12W to select the transmission of the W small response demand signal WS. Step S13 follows for enabling the intermittent transmission of the W small response demand signal WS with timer interruption.

The timer interruption for the intermittent transmission is carried out at the interval of u seconds as clearly illustrated in FIGS. 22 and 23. More specifically, the A and B response demand signals in the flowchart of FIG. 20 are replaced with the W large and W small response demand signals WL, WS, respectively. As the driver or the entry key steps out from the vehicle and receives the W small response demand signal, it sends back the W code in response. The W code is then received by the vehicle mounted receiver allowing Step S14 to judge "YES" and the welcome process at Step S18 follows.

Figure 10:
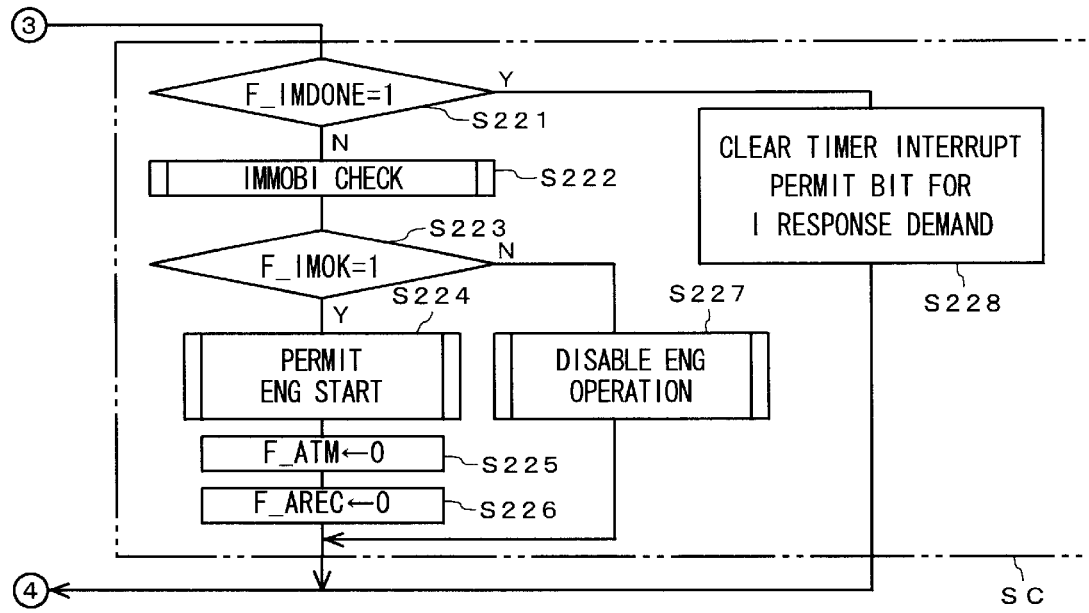
FIG. 10 is a flowchart showing the remaining part of the welcome process in FIG. 4.
Figure 26:
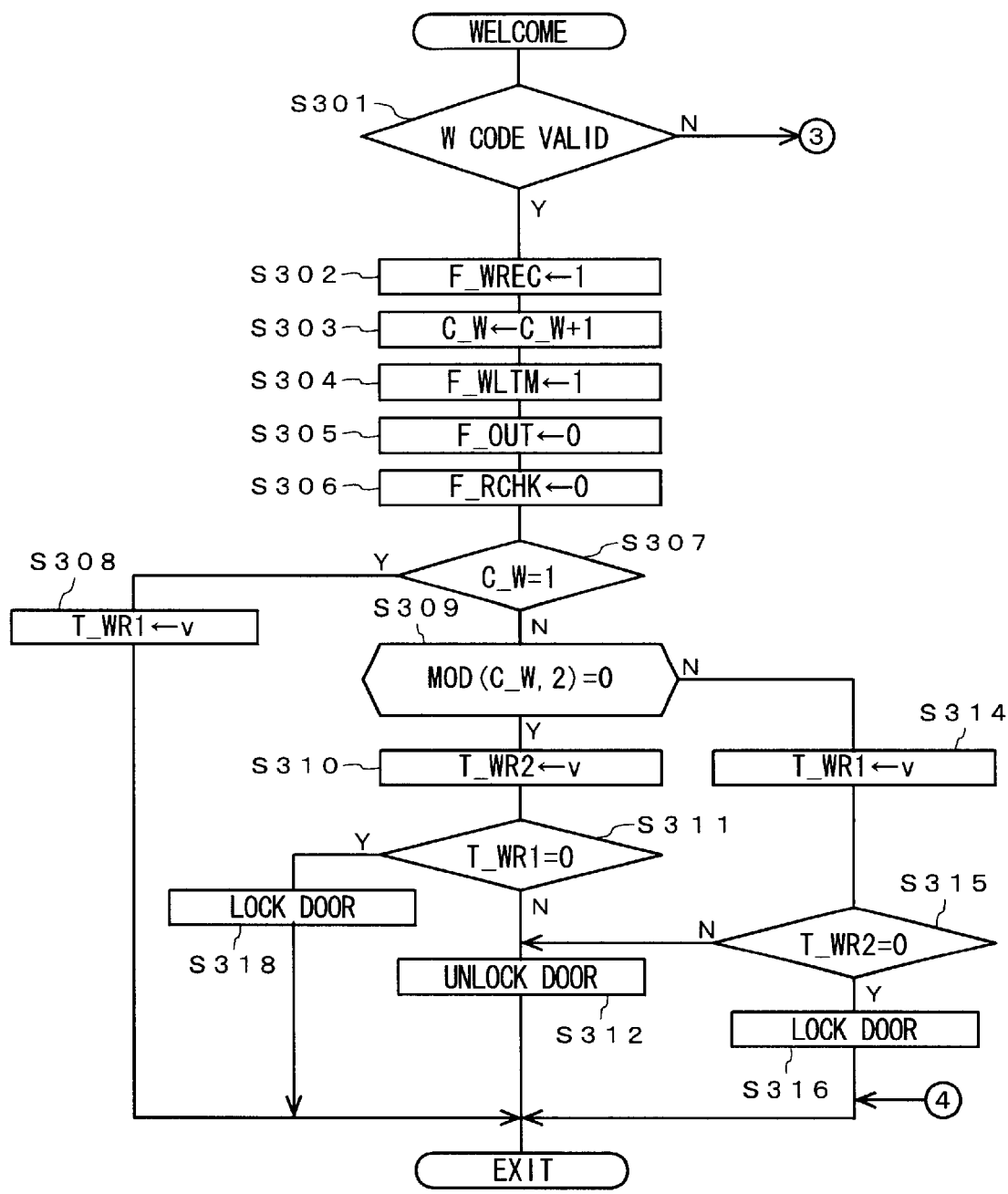
FIG. 26 is a flowchart showing a part of a welcome process in FIG. 24.

FIG. 26 illustrates the flowchart of the welcome process which is to be combined with FIG. 10. The operation is first explained when the driver disembarks and its entry key departs from the vehicle. As the W code transmitted from the entry key responding to the reception of the W small response demand signal WS from the vehicle is received by the vehicle, it is judged "YES" at Step S301 and the procedure goes to Step S302. If it is judged "NO", the procedure jumps to Step S221 in FIG. 10. At Step S302, the WREC flag indicating the reception of the W code is shifted to 1.

This is followed by a sequence of Steps S303 to S306 for updating by one the count of the W counter which represents the number of receptions of the W code (the count incremented to 1 by the first reception), shifting the WLTM flag to 1 for selecting the transmission of the W large response demand signal, turning the OUT flag to 0 for registering that the entry key is within the communication area of the W large response demand signal WL, and resetting the timer TOUT setting time for detecting that the entry key is no more close to the vehicle, respectively.

Then, it is examined at Step S307 whether the count of the W counter is 1 or not. As the count is 1 and judged "YES" by now, the procedure advances to Step S308 for setting and initiating the first timer for the receiving interval with the time v and then returns back to Step S2 in FIG. 24. At the next cycle of receiving the W code, Steps S307 judges "NO" and the procedure goes to Step S309 where it is examined whether the remainder of the count of the W counter divided by 2 is 0 or not, i.e. whether the count of the W counter is an odd number or an even number.

As the count is 2 and it is judged "YES", the second timer TWR2 is equally set to v and initiated at Step S310. Then, Step S311 follows for examining whether the first timer TWR1 is counted up or not. As described previously referring with FIG. 22, the W codes are continuously released in response to the W large and small response demand signals WL and WS for a while after the disembarkation and can thus be received before the timers are timed up. Accordingly, Step S311 judge "NO".

Therefore, the procedure advances to Step S312 for maintaining the unlocked state of the door. When the reception of the next W code increases the count of the W counter to 3, the procedure goes from Step S309 to Step S314 for setting and initiating the first timer TWR1 with the time v. It is then examined at Step S315 whether the second timer TWR2 is counted up or not.

While the entry key departs not far enough from the vehicle, Step S315 judges "NO" as described above and the unlocked state of the door is maintained at Step S312. When the entry key departs far enough from the vehicle and is disabled to receive the W small response demand signal WS, it is then judged "YES" at Step S315 and the procedure goes to Step S316 where the door of the vehicle is locked. Also, when Step S311 judges "YES" upon an even number of receiving times of the W code, the door is locked at Step S318.

As the entry key 50 departs further from the vehicle, it is disabled to receive the W large response demand signal WL and fails to deliver the corresponding W code to the vehicle. It is then judged "NO" at Step S14 in FIG. 24 and the procedure goes from Steps S15A and S30 to Step S35. At the time, Step S35 judges "YES" and the initialization is executed at Steps S36W to S39W and S40. More particularly, the W counter is reset to zero, the first timer TWR1 and the second timer TWR2 are reset, the WSTM flag is turned to 0, and the OUT flag is shifted to 1.

The action of automatically unlocking the door will now be explained when the driver carrying the entry key 50 moves towards the vehicle for embarkation. As the entry key 50 steps into the communication area of the W large response demand signal WL and receives the signal WL, it releases the corresponding W code. When the W code is received for the first time and judged at Step S301 in FIG. 26 that it is valid, the same process at Steps S302 to S307 are repeated.

More specifically, the W counter is reset to 1, the WLTM flag is shift to 1, the OUT flag is shifted to 0 for registering that the entry key is within the communication area, and the timer T-OUT is reset. At the time, Step S307 judges "YES" and the first timer TWR1 is set to v at Step S308 before the welcome process is terminated.

As the reception of the next W code causes Step S307 to judge "NO" and Step S309 to judge "YES", the second timer for the receiving interval TWR2 is set with v at Step S310. Step S311 follows where it is judged "YES" because the entry key 50 receives only the W large response demand signal WL and the interval of the W code is long enough, hence maintaining the locked state of the door.

Also, when the procedure goes from Step S309 to Steps S314 and 315, the locked state of the door is maintained at Step S316. As the entry key comes closer to the vehicle and receives too the W small response demand signal WS, Step S311 or S315 judges "NO" permitting the door to be unlocked.

When the driver opens the door, steps into the vehicle, and shuts up the door, it is then judged "YES" at Step S6 (FIG. 24) and the timer interrupted transmission of the I response demand signal is enabled at Step S8. As described with the first embodiment, when the I code comparison is confirmed, the action of the engine is enabled. As the ignition switch IGN SW is turned by the driver to the ON position, the engine starts running and simultaneously, the transmission of the W response demand signals and the I response demand signal is stopped. Then, the flags are initialized at the steps in Block S41 (FIG. 25).

According to this embodiment, while the two types, WL and WS, of the response demand signal can successfully be switched from one to another by changing only the output level of the response demand signal from the vehicle mounted transmitter, the response code released from the entry key is used only of one type, W code. Therefore, the transmitter and receiver arrangements as well as the code identification function will significantly be simplified, thus contributing to the lower cost and the ease of maintenance.

Although both the unlocking and locking actions of the door are automatically controlled according to the reception of response signal to the response demand signals on the vehicle mounted receiver in the embodiments mentioned above, it will clearly be understood by those skilled in the art to automate only one of the two actions for more simplicity.

According to the present invention recited in claims 1 and 2, the distance from the vehicle to the user carrying the portable transmitter/receiver (entry key) can precisely be identified thus to control the vehicle mounted device such as the door(s) at an optimum length of the distance, hence improving the utility of controlling the vehicle mounted device such as unlocking and locking the door(s) is compatible with improvement in the anti-thief function.

According to the present invention recited in claim 3, the distance from the vehicle to the user carrying the portable transmitter/receiver can be identified on the basis of the interval between receiving timings of the sent-back response signal on the vehicle even if the characteristic codes included in the response signals are not different each other, which response signals are sent back from the portable transmitter/receiver in response to a plurality kinds of the response demand signal receivable within their respective sizes of the predetermined ranges which are different each other. Hence, the vehicle mounted device can favorably be controlled depending on the distance as well as the construction of the transmitter of the portable transmitter/receiver and the code identifying action of the controlling means on the vehicle can significantly be simplified.

According to the present invention recited in claim 4, the response signal is also released at intervals of time from the portable transmitter/receiver, thus providing the same effects and advantages as described just above relating to the claim 3 invention.

According to the present invention recited in claim 5, as the response signals released from the portable transmitter/receiver in response to reception of the response demand signal are different each other based on the different sizes of the receivable ranges of the demand signals, the distance from the vehicle to the portable transmitter/receiver can be identified only from the response signal received and the optimum control of the device mounted on the vehicle can be performed in accordance with the distance.

According to the present invention recited in claims 6 and 1, at the disembarkation of the user, as the portable transmitter/receiver carried by the user departs far from the vehicle, the transmission of the response demand signal receivable in a predetermined wider size of the range is executed, while the transmission of the response demand signal receivable in a predetermined smaller size of the range is canceled. As the potable transmitter/receiver comes from far towards the vehicle, on the other hand, the transmission of the response demand signal with a smaller predetermined receivable range is not executed before the response signal responding to the response demand signal with the largest predetermined receivable range is received by the vehicle.

More particularly, while the portable transmitter/receiver is out of the largest predetermined receivable range, the response demand signal receivable in the largest predetermined range only is transmitted. Only when the response signal responding to the response demand signal receivable in the largest predetermined range is received by the vehicle, the transmission of the response demand signal receivable in a smaller size of the predetermine range and used for actually controlling the unlocking and locking of the door is executed. Therefore, the transmission of the response demand signal is minimized hence reducing the consumption of a power from a battery equipped on the vehicle.

According to the present invention recited in claim 1, the user carrying the portable transmitter/receiver in the vehicle can precisely be acknowledged, and the vehicle mounted device in the vehicle is controlled on the basis of the response signal from the portable transmitter/receiver responding to a particular type of the response demand signal receivable within the vehicle, hence improving the anti-thief function.

In brief, the present invention allows the entry key to receive the response demand signal for a wider communication area and send back a response signal to the vehicle, and the vehicle to transmit the response demand signal for a smaller communication area only when the response signal from the entry key is examined and qualified to be valid by its welcome code comparison. In other words, even if any other person or object not relating to the vehicle is within the communication area A shown in FIG. 13, no transmission of the B response demand signal is permitted.

Accordingly, the transmission of the B response demand signal for actually controlling the locking and unlocking action of the door is minimized hence favorably reducing the consumption of a power in the battery. Also, while the power consumption is minimized, the transmission of the response demand signals can be executed at optimum intervals of time for a relatively smaller size of the communication area corresponding to the distance from the entry key to the vehicle thus to precisely control the vehicle mounted components, for example, automatically unlocking and locking the door of the vehicle. More particularly, the control over the vehicle mounted components with the entry key can be made in compatibility with the energy saving. In practice, while the power consumption is minimized, the anti-thief function can be realized at higher utility.

Moreover, as different types of the response demand signals are transmitted from the vehicle at intervals of time, the transmission of the response demand signal for a wider communication area is executed at intervals of a longer duration. This permits the control system to readily acquire the distance from the vehicle to the entry key on the basis of the interval between receiving timings of the response signal from the entry key without discriminating the response demand signals and the response signals received, respectively, from each other and thus to favorably control the vehicle mounted components such as doors. Accordingly, the overall system can further be simplified in construction and operation.

What is claimed is:

1. A remote control system for a vehicle comprising:
   a transmitter mounted on the vehicle for transmitting a response demand signal receivable within a predetermined range outside the vehicle;
   a receiver mounted on the vehicle for receiving a response signal sent back from a portable transmitter/receiver which sends back the response signal in response to reception of the response demand signals; and
   a controlling means for controlling vehicle-mounted components corresponding to the reception of the response signal by the receiver, wherein
   said transmitter arranged to transmit a plurality of different response demand signals receivable within corresponding sizes of the predetermined range and,
   said controlling means arranged to identify the size of the predetermined range where the portable transmitter/receiver is located, on the basis of the interval between receptions of the response signals and to control the vehicle-mounted components in a predetermined mode, corresponding to the size of the predetermined range where the transmitter/receiver is located.

2. A remote control system for a vehicle according to claim 1 wherein the transmitter transmits at least two different response demand signals at different intervals such that the transmission of one of the response demand signal receivable within a smaller size of the predetermined range is executed at least once between two adjacent transmitting timings of the other of the response demand signal receivable in a larger size of the predetermined range.

3. A remote control system for a vehicle comprising:
   a transmitter mounted on the vehicle for transmitting a response demand signal receivable within a predetermined range outside the vehicle;
   a receiver mounted on the vehicle for receiving a response signal sent back from a portable transmitter/receiver which sends back the response signal in response to reception of the response demand signals;
   a controlling means for controlling vehicle-mounted components corresponding to the reception of the response signal by the receiver; and
   a disembarkation detecting means for detecting the disembarkation of a user, wherein
   said transmitter arranged to transmit a plurality of different response demand signals receivable within corresponding sizes of the predetermined range,
   said controlling means arranged to identify the size of the predetermined range where the portable transmitter/receiver is located, on the basis of the interval between receptions of the response signals and to control the vehicle-mounted components in a predetermined mode, corresponding to the size of the predetermined range where the transmitter/receiver is located,
   when the disembarkation of the user is detected, a response demand signal receivable within the smallest size of the predetermined range is transmitted from the transmitter, and
   when the response signal showing reception of the response demand signal receivable in the smallest size of the predetermined range is no more received by the receiver mounted on the vehicle, a second response demand signal receivable within the second smallest size of the predetermined range is begun to be transmitted from the transmitter and, in a similar manner, when the response signal to said second response demand signal receivable in a relatively smaller size of the predetermined range is no more received by the receiver mounted on the vehicle, a third response demand signal receivable within a relatively larger size of the predetermined range is begun to be transmitted in sequence from the transmitter.

4. remote control system for a vehicle according to claim 1 wherein when the response signal to a response demand signal receivable within the largest size of the predetermined range is received after it is not received by the receiver mounted on the vehicle, the response demand signal receivable within second largest size of the predetermined range is transmitted from the transmitter in addition to the response demand signal receivable within the largest predetermined range and then a response demand signal receivable within a relatively smaller size of the predetermined range is transmitted in sequence from the transmitter.

5. A remote control system for a vehicle comprising:
- a transmitter mounted on the vehicle for transmitting a response demand signal receivable within a predetermined range outside the vehicle;
- a portable transmitter/receiver for sending back a response signal in response to reception of the response demand signal;
- a receiver mounted on the vehicle for receiving the response signal sent back from the portable transmitter/receiver; and
- a controlling means for controlling vehicle-mounted components responding whether the receiver receives the response signal or not,
- said transmitter arranged to transmit a plurality of response demand signals receivable within different corresponding predetermined ranges and,
- said controlling means arranged to identify that the portable transmitter/receiver exists within the largest predetermined receivable range when a response signal is received by the receiver, which response signal corresponds to reception of particular response demand signal being receivable within the largest predetermined receivable range and to control at least either unlocking or locking of a door(s) of the vehicle depending on whether a response signal is received or not by the receiver, which response signal corresponds to reception of another response demand signal than a particular one being receivable within the largest predetermined receivable range, wherein besides the response demand signal receivable within the largest size of the predetermined range, two different response demand signals for control unlocking and locking of a door(s) of the vehicle are transmitted, wherein the predetermined range transmitted for the response demand signal for locking is smaller than the predetermined range transmitted for the response demand signal for unlocking.

6. A remote control system for a vehicle according to claim 1, further comprising a disembarkation detecting means for detecting the disembarkation of a user, wherein when the disembarkation of the user is detected, a response demand signal receivable within the smallest size of the predetermined range is transmitted from the transmitter, and when the response signal showing reception of the response demand signal receivable in the smallest size of the predetermined range is no more received by the receiver mounted on the vehicle, a second response demand signal receivable within the second smallest size of the predetermined range is begun to be transmitted from the transmitter in addition to the response demand signal receivable in the smallest size of the predetermined range and, in similar manner, a response demand signal receivable within a relatively larger size of the predetermined range is transmitted in sequence from the transmitter.

* * * * *